United States Patent
Maruyama et al.

(10) Patent No.: US 10,531,029 B2
(45) Date of Patent: Jan. 7, 2020

(54) IMAGE PROCESSING APPARATUS, IMAGE PROCESSING METHOD, AND COMPUTER READABLE RECORDING MEDIUM FOR CORRECTING PIXEL VALUE OF PIXEL-OF-INTEREST BASED ON CORRECTION AMOUNT CALCULATED

(71) Applicant: OLYMPUS CORPORATION, Tokyo (JP)

(72) Inventors: Hiroki Maruyama, Hino (JP); Manabu Ichikawa, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/948,000

(22) Filed: Apr. 9, 2018

(65) Prior Publication Data
US 2018/0234650 A1 Aug. 16, 2018

Related U.S. Application Data

(63) Continuation of application No. PCT/JP2015/079896, filed on Oct. 22, 2015.

(51) Int. Cl.
*H04N 5/367* (2011.01)
*H04N 1/60* (2006.01)
(Continued)

(52) U.S. Cl.
CPC ............. *H04N 5/3675* (2013.01); *G01J 3/28* (2013.01); *H04N 1/60* (2013.01); *H04N 5/142* (2013.01);
(Continued)

(58) Field of Classification Search
CPC ...... H04N 5/357; H04N 5/367; H04N 5/3675; H04N 9/04551; H04N 9/04557;
(Continued)

(56) References Cited

U.S. PATENT DOCUMENTS 7,106,371 B1 * 9/2006 Kubo .................. H04N 5/367
348/246
7,656,443 B2 * 2/2010 Ikeda .................. H04N 5/3572
348/243
(Continued)

FOREIGN PATENT DOCUMENTS

CN 103297718 A 9/2013
JP 2007-010364 A 1/2007
(Continued)

OTHER PUBLICATIONS

International Search Report dated Jan. 12, 2016 issued in PCT/JP2015/079896.
(Continued)

*Primary Examiner* — Ngoc Yen T Vu
(74) *Attorney, Agent, or Firm* — Scully, Scott, Murphy & Presser, P.C.

(57) ABSTRACT

An image processing apparatus includes: an acquisition unit configured to obtain image data generated by an image sensor forming an array pattern using color filters having mutually different spectral transmittances and to obtain a correction coefficient for correcting a difference between pixel values corresponding to a difference between a spectral sensitivity and a preset reference spectral sensitivity in a wavelength range in a pixel-of-interest; a correction amount calculation unit configured to calculate an estimation value of a color component in the pixel-of-interest using a pixel value of each of pixels in surrounding pixels of a same color and the correction coefficient and configured to calculate a correction amount of the pixel value of the pixel-of-interest based on the estimation value and the correction coefficient of the pixel-of-interest; and a pixel value correction unit configured to correct the pixel value of the pixel-of-interest based on the calculated correction amount.

13 Claims, 24 Drawing Sheets

(51) Int. Cl.
*H04N 5/14* (2006.01)
*G01J 3/28* (2006.01)
*H04N 9/04* (2006.01)

(52) U.S. Cl.
CPC ....... *H04N 9/045* (2013.01); *H04N 2209/046* (2013.01)

(58) Field of Classification Search
CPC ................... H04N 1/60; H04N 1/6008; H04N 2209/045–049; H04N 9/045; G01J 3/28
See application file for complete search history.

(56) References Cited

U.S. PATENT DOCUMENTS

| | | | | |
|---|---|---|---|---|
| 7,853,099 | B2* | 12/2010 | Shinmei | H04N 5/357 348/222.1 |
| 2006/0203292 | A1 | 9/2006 | Wu | |
| 2006/0290929 | A1 | 12/2006 | Imura | |
| 2011/0122283 | A1* | 5/2011 | Nagata | H04N 9/045 348/223.1 |
| 2013/0229550 | A1* | 9/2013 | Nakao | H04N 5/367 348/247 |
| 2014/0211060 | A1 | 7/2014 | Funao | |
| 2014/0320705 | A1* | 10/2014 | Kaizu | H04N 9/045 348/246 |

FOREIGN PATENT DOCUMENTS

| | | |
|---|---|---|
| JP | 2010-190741 A | 9/2010 |
| JP | 2010-193378 A | 9/2010 |
| JP | 2015-070348 A | 4/2015 |

OTHER PUBLICATIONS

Extended Supplementary European Search Report dated May 8, 2019 in European Patent Application No. 15 90 6708.1.
Chinese Office Action dated Sep. 10, 2019 received in 201580083713.1.

* cited by examiner

IMAGE PROCESSING APPARATUS, IMAGE PROCESSING METHOD, AND COMPUTER READABLE RECORDING MEDIUM FOR CORRECTING PIXEL VALUE OF PIXEL-OF-INTEREST BASED ON CORRECTION AMOUNT CALCULATED

CROSS-REFERENCE TO RELATED APPLICATIONS

This application is a continuation of PCT International Application No. PCT/JP2015/079896 filed on Oct. 22, 2015, the entire contents of which are incorporated herein by reference.

BACKGROUND

The present disclosure relates to an image processing apparatus, an image processing method, and a computer readable recording medium.

In imaging apparatuses such as digital cameras, there is a known technique of adjusting, for each image sensor, variations in spectral sensitivity of pixels due to variations in spectral transmittance of a color filter provided on a light receiving surface of an image sensor such as a charge coupled device (CCD) and a complementary metal oxide semiconductor (CMOS) (refer to JP 2010-193378 A). In this technique, visible light spectrally split by a prism is photo-electrically converted by an image sensor to calculate values of red (R), green (G), and blue (B) components from image data including a combination of these color components of R, G, and B for each of wavelengths, and then, a correction coefficient to be multiplied to each of the R, G, and B values so as to decrease a difference between each of the calculated R, G, and B values and a reference value calculated beforehand for each of wavelengths, and thereafter the variation in the spectral sensitivity for each of image sensors is corrected using the calculated correction coefficient.

SUMMARY

An image processing apparatus according to one aspect of the present disclosure includes: an acquisition unit configured to obtain image data generated by an image sensor that forms a predetermined array pattern using color filters of a plurality of colors having mutually different spectral transmittances and in which each of the color filters is arranged at a position corresponding to any of a plurality of pixels and to obtain a correction coefficient from a recording unit configured to record, for each of the pixels, the correction coefficient for correcting a difference between pixel values corresponding to a difference between a spectral sensitivity and a preset reference spectral sensitivity in a predetermined wavelength range in a pixel-of-interest; a correction amount calculation unit configured to calculate an estimation value of a color component as a correction target in the pixel-of-interest using a pixel value of each of pixels in surrounding pixels of a same color and the correction coefficient, the surrounding pixel of a same color being a pixel surrounding the pixel-of-interest and being a pixel including a color filter having a same color as a color filter arranged on the pixel-of-interest, and configured to calculate a correction amount of the pixel value of the pixel-of-interest based on the estimation value and the correction coefficient of the pixel-of-interest; and a pixel value correction unit configured to correct the pixel value of the pixel-of-interest based on the correction amount calculated by the correction amount calculation unit.

The above and other features, advantages and technical and industrial significance of this disclosure will be better understood by reading the following detailed description of presently preferred embodiments of the disclosure, when considered in connection with the accompanying drawings.

DETAILED DESCRIPTION

Figure 1:
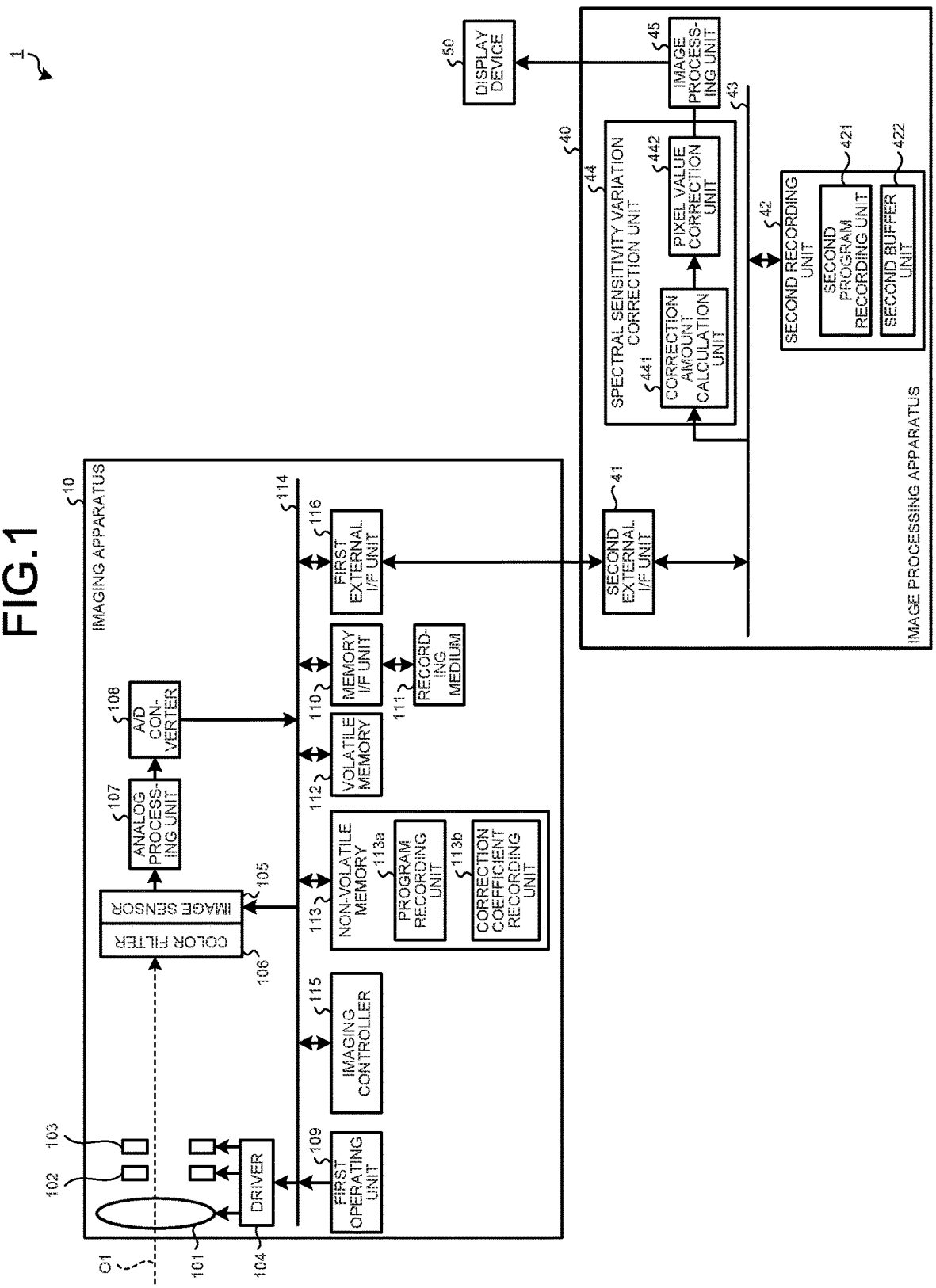
FIG. 1 is a block diagram schematically illustrating a configuration of an imaging system according to a first embodiment.

Hereinafter, embodiments will be described with reference to the drawings. Note that the present disclosure is not limited by the following embodiments. In the description of the drawings, the same portions are given the same reference numerals.

First Embodiment

Configuration of imaging system FIG. 1 is a block diagram schematically illustrating a configuration of an imaging system according to a first embodiment. An imaging system 1 illustrated in FIG. 1 includes an imaging apparatus 10, an image processing apparatus 40, and a display device 50.

Configuration of Imaging Apparatus

First, a configuration of the imaging apparatus 10 will be described. The imaging apparatus 10 includes an optical system 101, a diaphragm 102, a shutter 103, a driver 104, an image sensor 105, a color filter 106, an analog processing unit 107, an A/D converter 108, a first operating unit 109, a memory I/F unit 110, a recording medium 111, a volatile memory 112, a non-volatile memory 113, a bus 114, an imaging controller 115, and a first external I/F unit 116.

The optical system 101 includes one or more lenses. The optical system 101 includes a focus lens and a zoom lens, for example.

The diaphragm 102 adjusts exposure by limiting an incident amount of light collected by the optical system 101. Under the control of the imaging controller 115, the diaphragm 102 limits the incident amount of the light collected by the optical system 101. The incident amount of light may be controlled using the shutter 103 and an electronic shutter in the image sensor 105 without using the diaphragm 102.

Under the control of the imaging controller 115, the shutter 103 sets a state of the image sensor 105 to an exposure state or a light shielding state. The shutter 103 includes a focal plane shutter, for example. It is allowable to use the electronic shutter in the image sensor 105 instead of the shutter 103.

Under the control of the imaging controller 115 described below, the driver 104 drives the optical system 101, the diaphragm 102, and the shutter 103. For example, the driver 104 performs zoom magnification change or focusing position adjustment for the imaging apparatus 10 by moving the optical system 101 along an optical axis O1.

Under the control of the imaging controller 115 described below, the image sensor 105 receives the light collected by the optical system 101, converts the received light into image data (electric signal), and outputs the image data. The image sensor 105 is formed with an image sensor such as complementary metal oxide semiconductor (CMOS) or a charge coupled device (CCD) in which a plurality of pixels is two-dimensionally arranged. Moreover, the image sensor 105 has an electronic shutter function capable of electronically controlling the amount of received light.

The color filter 106 is stacked on a light receiving surface of the image sensor 105. The color filter 106 is configured to allow a plurality of color filters transmitting light having mutually different wavelength regions to form a predetermined array pattern, and each of the color filters with this array pattern is arranged at a position corresponding to any of the plurality of pixels constituting the image sensor 105. The color filter 106 includes, in a Bayer array, a filter R transmitting light in the red wavelength region, a filter G transmitting light in the green wavelength region, and a filter B transmitting light in the blue wavelength region, each being arranged on the light receiving surface of each of the pixels of the image sensor 105. In the following description, a pixel on which the filter R is arranged on the light receiving surface is referred to as an R-pixel, a pixel on which the filter G is arranged on the light receiving surface is referred to as a G-pixel, and a pixel on which the filter B is arranged on the light receiving surface is referred to as a B-pixel.

The analog processing unit 107 performs predetermined analog processing onto an analog signal output from the image sensor 105 and outputs the processed signal to the A/D converter 108. Specifically, the analog processing unit 107 performs noise reduction processing, gain-up processing, or the like, on the analog signal input from the image sensor 105. For example, the analog processing unit 107 performs, onto the analog signal, reduction of reset noise, etc. and waveform shaping, and then, further performs gain-up so as to achieve intended brightness.

The A/D converter 108 generates digital image data (hereinafter, referred to as "RAW image data") by performing A/D conversion onto the analog signal input from the analog processing unit 107, and outputs the generated data to the volatile memory 112 via the bus 114. Note that the A/D converter 108 may directly output the RAW image data to each of portions of the imaging apparatus 10 described below. Note that it is allowable to configure such that the color filter 106, the analog processing unit 107 and the A/D converter 108 are provided on the image sensor 105, and that the image sensor 105 directly outputs digital RAW image data.

The first operating unit 109 provides various instructions to the imaging apparatus 10. Specifically, the first operating unit 109 includes a power switch, a release switch, an operation switch, and a moving image switch. The power switch switches the power supply states of the imaging apparatus 10 between an on-state and an off-state. The release switch provides an instruction of still image shooting. The operation switch switches various settings of the imaging apparatus 10. The moving image switch provides an instruction of moving image shooting.

The recording medium 111 includes a memory card attached from outside of the imaging apparatus 10, and is removably attached onto the imaging apparatus 10 via the memory I/F unit 110. Moreover, the recording medium 111 may output programs and various types of information to the non-volatile memory 113 via the memory I/F unit 110 under the control of the imaging controller 115.

The volatile memory 112 temporarily stores image data input from the A/D converter 108 via the bus 114. For example, the volatile memory 112 temporarily stores image data sequentially output from the image sensor 105 frame by frame, via the analog processing unit 107, the A/D converter 108, and the bus 114. The volatile memory 112 includes a synchronous dynamic random access memory (SDRAM).

The non-volatile memory 113 records various programs needed to operate the imaging apparatus 10 and various types of data used in execution of the program. The non-volatile memory 113 includes a program recording unit 113a and a correction coefficient recording unit 113b configured to record a correction coefficient for correcting variations in spectral sensitivity of each of the plurality of pixels constituting the image sensor 105, input via the first external I/F unit 116. Note that the correction coefficient is a coefficient for correcting a difference between the pixel values corresponding to the difference between the spectral sensitivity and the preset reference spectral sensitivity in a predetermined wavelength range on a pixel-of-interest. The reference spectral sensitivity is an average spectral sensitivity of pixels having a same color in each of the color filters when uniform light is applied to the image sensor 105. This correction coefficient is calculated beforehand by an apparatus (not illustrated) and recorded in the correction coefficient recording unit 113b.

The bus 114 includes a transmission line that connects individual components of the imaging apparatus 10 with each other, and transfers various types of data generated inside the imaging apparatus 10 to each of the individual components of the imaging apparatus 10.

The imaging controller 115 includes a central processing unit (CPU), and integrally controls operation of the imaging apparatus 10 by providing instruction and transferring data to individual components of the imaging apparatus 10 in response to an instruction signal and a release signal from the first operating unit 109. For example, in a case where a second release signal has been input from the first operating unit 109, the imaging controller 115 performs control of starting shooting operation on the imaging apparatus 10. Herein, the shooting operation on the imaging apparatus 10 is operation of predetermined processing performed by the analog processing unit 107 and the A/D converter 108, onto an analog signal output by the image sensor 105. The image data processed in this manner are recorded in the recording medium 111 via the bus 114 and the memory I/F unit 110 under the control of the imaging controller 115.

The first external I/F unit 116 outputs information input from external apparatuses via the bus 114, to the non-volatile memory 113 or the volatile memory 112, and together with this, outputs, to external apparatuses via the bus 114, information stored in the volatile memory 112, information recorded in the non-volatile memory 113, and the image data generated by the image sensor 105. Specifically, the first external I/F unit 116 outputs the image data generated by the image sensor 105 and the correction coefficient recorded in the correction coefficient recording unit 113b, to the image processing apparatus 40 via the bus 114.

Configuration of Image Processing Apparatus

Next, a configuration of the image processing apparatus 40 will be described.

The image processing apparatus 40 includes a second external I/F unit 41, a second recording unit 42, a bus 43, a spectral sensitivity variation correction unit 44, and an image processing unit 45.

The second external I/F unit 41 obtains the image data generated by the image sensor 105 and the correction coefficient recorded by the correction coefficient recording unit 113b individually via the first external I/F unit 116 of the imaging apparatus 10, and outputs the obtained image data and correction coefficients to the spectral sensitivity variation correction unit 44 or the second buffer unit 422. The second external I/F unit 41 and the first external I/F unit 116 are mutually connected via a control cable, a wireless communication path, or the like, capable of bidirectionally exchanging information. The second external I/F unit 41 functions as an acquisition unit according to the first embodiment.

The second recording unit 42 includes a volatile memory and a nonvolatile memory, and records image data input from the imaging apparatus 10 via the second external I/F unit 41, correction coefficients, and various programs needed for operation of the image processing apparatus 40, and various data to be used during execution of the program. The second recording unit 42 further includes a second program recording unit 421 that records a program for driving the image processing apparatus 40, and a second buffer unit 422 temporarily storing the image data and the correction coefficient of the pixel-of-interest input from the imaging apparatus 10.

The bus 43 includes a transmission line connecting individual components of the image processing apparatus 40 with each other, and transfers various types of data generated inside the image processing apparatus 40 to each of the individual components of the image processing apparatus 40.

The spectral sensitivity variation correction unit 44 corrects variations in the spectral sensitivity of each of the pixels of the image corresponding to the image data obtained by the second external I/F unit 41, and outputs the corrected data to the image processing unit 45. The spectral sensitivity variation correction unit 44 includes a correction amount calculation unit 441 and a pixel value correction unit 442. Note that the spectral sensitivity variation correction unit 44 may perform optical black (OB) subtraction processing in a case where an optical black (OB) value is contained in the image data.

The correction amount calculation unit 441 calculates an estimation value of a color component as a correction target in the pixel-of-interest using a correction coefficient in the pixel-of-interest, recorded by the correction coefficient recording unit 113b, and using the pixel value of each of the pixels in surrounding pixels of a same color around the pixel-of-interest, the surrounding pixel of a same color being a pixel surrounding the pixel-of-interest and being a pixel including a color filter having a same color as a color filter arranged on the pixel-of-interest, and then, calculates a correction amount of the pixel value of the pixel-of-interest based on the estimation value and the correction coefficient of the pixel-of-interest. Here, the surrounding pixel of a same color is a pixel located in the vicinity of the pixel-of-interest and having a color filter of the same color as the color of the color filter arranged on the pixel-of-interest.

The pixel value correction unit 442 corrects the pixel value of the pixel-of-interest using the correction amount calculated by the correction amount calculation unit 441. Specifically, the pixel value correction unit 442 corrects the pixel value of the pixel-of-interest by subtracting the correction amount calculated by the correction amount calculation unit 441 from the pixel value of the pixel-of-interest, and outputs the corrected pixel value to the image processing unit 45.

The image processing unit 45 performs predetermined image processing onto the image data in which spectral sensitivity variation has been corrected by the spectral sensitivity variation correction unit 44, and outputs the processed image data to the display device 50. The predetermined image processing herein corresponds to basic image processing including white balance adjustment processing, and including synchronization processing of the image data, color matrix calculation processing, γ correction processing, color reproduction processing, edge enhancement processing, and noise reduction processing in a case where the image sensor 105 is arranged in a Bayer array. Moreover, the image processing unit 45 performs image processing of reproducing a natural image based on individual image processing parameters that have been set beforehand. The parameters of image processing are values of contrast, sharpness, saturation, white balance, and gradation. Note that the image data that has undergone predetermined image processing may be recorded in the non-volatile memory 113 or the recording medium 111 of the imaging apparatus 10 via the second external I/F unit 41.

Configuration of Display Device

Next, a configuration of the display device 50 will be described. The display device 50 displays an image that corresponds to the image data input from the image processing apparatus 40. The display device 50 includes a display panel of liquid crystal, organic electroluminescence (EL).

In the imaging system 1 having the above configuration, the image processing apparatus 40 obtains each of the image data and the correction coefficient from the imaging apparatus 10 and calculates a correction amount for correcting the pixel value of the pixel-of-interest of the image data using the obtained correction coefficient, and thereafter, the pixel value of the pixel-of-interest is corrected using the calculated correction amount. The display device 50 displays an image that corresponds to the image data image-processed by the image processing apparatus 40.

Processing on Image Processing Apparatus

Figure 2:
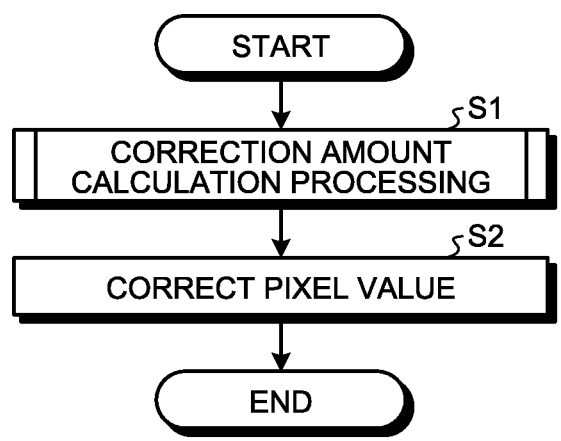
FIG. 2 is a flowchart illustrating an outline of processing executed by an image processing apparatus according to the first embodiment.

Next, processing executed by the image processing apparatus 40 will be described. FIG. 2 is a flowchart illustrating an outline of processing executed by the image processing apparatus 40, illustrating a main routine.

As illustrated in FIG. 2, the correction amount calculation unit 441 first obtains, from the imaging apparatus 10, image data generated by the image sensor 105 and the correction coefficient recorded by the correction coefficient recording unit 113*b*, and executes correction amount calculation processing of calculating the correction amount of the pixel value of the pixel-of-interest in the obtained image data (step S1). In this case, the correction amount is a signed value. Specifically, the correction amount is set to a negative value for a pixel in which the spectral sensitivity is lower than the reference spectral sensitivity, and is set to a positive value for a pixel in which the spectral sensitivity is higher than the reference spectral sensitivity. Details of the correction amount calculation processing will be described below. Note that in a case where the definitions of positive and negative of the correction amount are reversed, the addition and subtraction may be reversed in the processing using the correction coefficient described below.

The pixel value correction unit 442 corrects the pixel value of each of the pixels by subtracting the correction amount of each of the pixels calculated by the correction amount calculation unit 441 (step S2). After step S2, the image processing apparatus 40 finishes the current processing.

Correction Amount Calculation Processing

Figure 3:
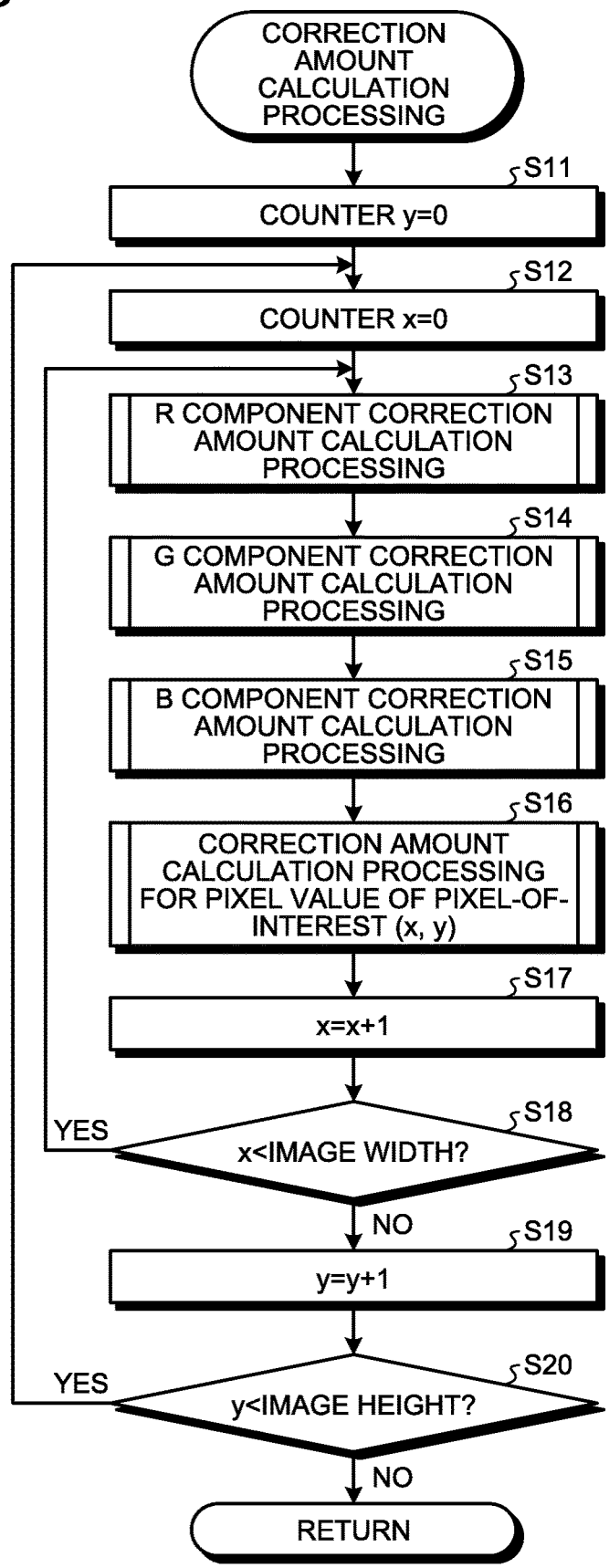
FIG. 3 is a flowchart illustrating an outline of correction amount calculation processing in FIG. 2.

Next, details of the correction amount calculation processing described in step S1 of FIG. 2 will be described. FIG. 3 is a flowchart illustrating an outline of the correction amount calculation processing.

As illustrated in FIG. 3, the correction amount calculation unit 441 first initializes (step S11) the counter y (counter y=0) indicating the position of the pixel in a height direction (vertical direction) of the image corresponding to the image data stored in the second buffer unit 422 of the second recording unit 42, and then, initializes (step S12) a counter x (counter x=0) indicating the position of the pixel in a width direction (horizontal direction) of the image corresponding to the image data.

Subsequently, the correction amount calculation unit 441 executes R component correction amount calculation processing (step S13) of calculating the correction amount of the R component for the pixel value at the pixel-of-interest (x, y). Note that the R component is a pixel value of the R wavelength band. Details of the R component correction amount calculation processing will be described below.

Subsequently, the correction amount calculation unit 441 executes G component correction amount calculation processing (step S14) of calculating the correction amount of the G component for the pixel value at the pixel-of-interest (x, y). Note that the G component is a pixel value of the G wavelength band. Details of the G component correction amount calculation processing will be described below.

Subsequently, the correction amount calculation unit 441 executes B component correction amount calculation processing (step S15) of calculating the correction amount of the B component for the pixel value at the pixel-of-interest (x, y). Note that the B component is a pixel value of the B wavelength band. Details of the B component correction amount calculation processing will be described below.

Thereafter, the correction amount calculation unit 441 executes correction amount calculation processing (step S16) of calculating the correction amount for the pixel value of the pixel-of-interest (x, y) based on the correction amount of each of the R component, the G component, and the B component respectively calculated in the above-described steps S13 to S15. The details of the correction amount calculation processing for the pixel-of-interest (x, y) will be described below.

Subsequently, the correction amount calculation unit 441 increments the counter x as (x=x+1) (step S17).

Thereafter, in a case where the counter x is smaller than the width of the image corresponding to the image data (step S18: Yes), the correction amount calculation unit 441 returns to step S13. In contrast, in a case where the counter x is not smaller than the width of the image corresponding to the image data (step S18: No), the correction amount calculation unit 441 proceeds to step S19 described below.

In step S19, the correction amount calculation unit 441 increments the counter y as (y=y+1).

Thereafter, in a case where the counter y is smaller than the height of the image corresponding to the image data (step S20: Yes), the image processing apparatus 40 returns to the above-described step S12. In contrast, in a case where the counter y is not smaller than the height of the image corresponding to the image data (step S20: No), the image processing apparatus 40 returns to the main routine in FIG. 2.

R Component Correction Amount Calculation Processing

Figure 4:
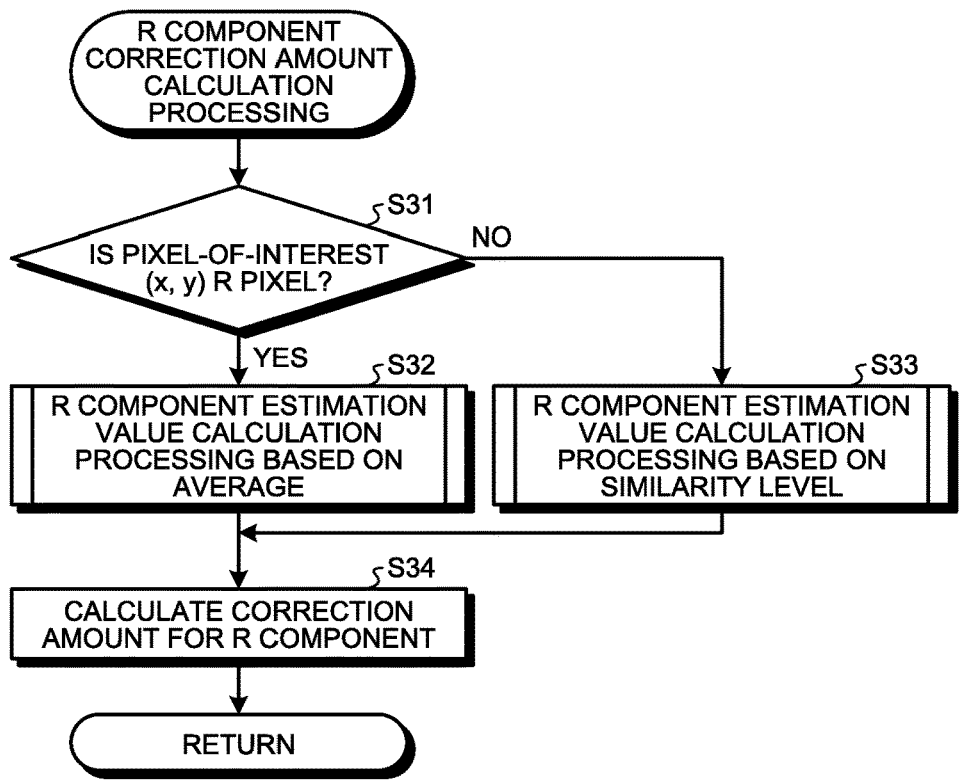
FIG. 4 is a flowchart illustrating an outline of R component correction amount calculation processing in FIG. 3.

Next, details of the R component correction amount calculation processing described in step S13 of FIG. 3 will be described. FIG. 4 is a flowchart illustrating an outline of R component correction amount calculation processing.

As illustrated in FIG. 4, in a case where the pixel-of-interest (x, y) is an R pixel (step S31: Yes), the correction amount calculation unit 441 first executes R component estimation value calculation processing based on average (step S32), that is, processing of calculating an estimation value of the R component based on an average value of the pixel values of the pixels surrounding the pixel-of-interest (x, y) (for example, 5×5 pixel range around the pixel-of-interest (x, y) as a center). Details of the R component estimation value calculation processing based on average will be described below. After step S32, the image processing apparatus 40 proceeds to step S34.

In step S31, in a case where the pixel-of-interest (x, y) is not an R pixel (step S31: No), the correction amount calculation unit 441 executes R component estimation value calculation processing based on a similarity level (step S33), that is, processing of calculating the estimation value of the R component based on a similarity level of the pixel value of the pixel-of-interest (x, y). Details of the R component estimation value calculation processing based on a similarity level will be described below. After step S33, the image processing apparatus 40 proceeds to step S34.

Subsequently, the correction amount calculation unit 441 multiplies the R component estimation value for the pixel-of-interest (x, y) estimated in the above-described step S32 or S33 by the R component correction coefficient of the pixel-of-interest (x, y) to calculate the correction amount of the R component for the pixel value of the pixel-of-interest (x, y) (step S34). After step S34, the image processing apparatus 40 returns to the subroutine of the correction amount calculation processing in FIG. 3.

G Component Correction Amount Calculation Processing

Figure 5:
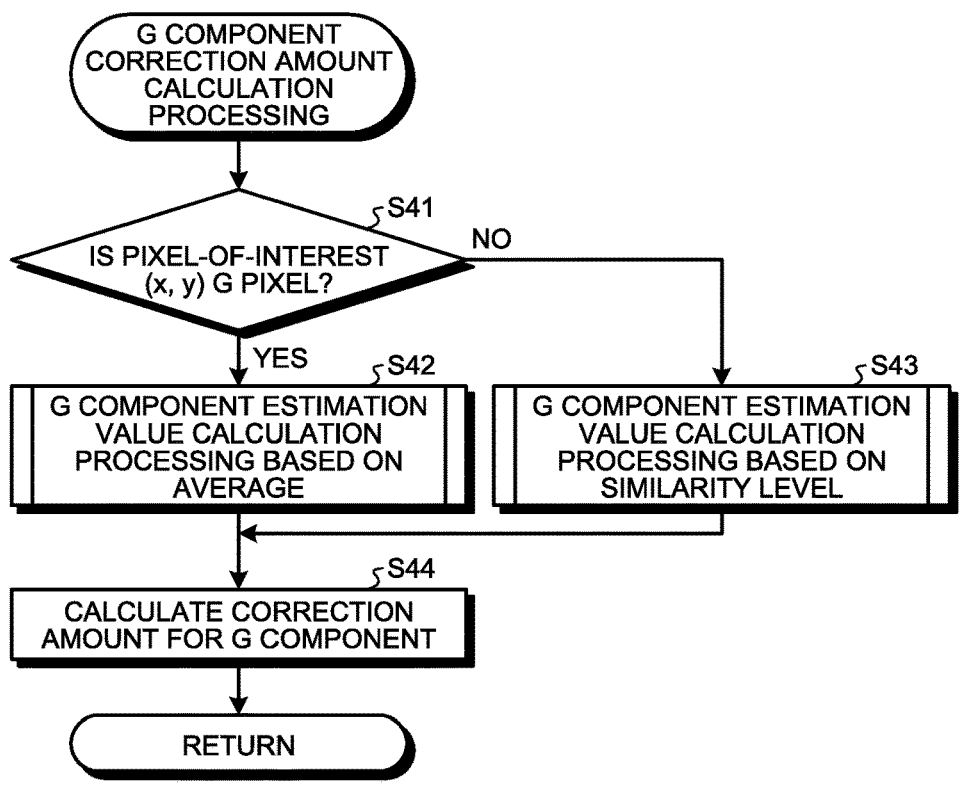
FIG. 5 is a flowchart illustrating an outline of G component correction amount calculation processing in FIG. 3.

Next, details of the G component correction amount calculation processing described in step S14 of FIG. 3 will be described. FIG. 5 is a flowchart illustrating an outline of G component correction amount calculation processing.

As illustrated in FIG. 5, in a case where the pixel-of-interest (x, y) is a G pixel (step S41: Yes), the correction amount calculation unit 441 first executes G component estimation value calculation processing based on average (step S42), that is, processing of calculating an estimation value of the G component based on the average value of the pixel value of the pixels surrounding the pixel-of-interest (x, y). Details of the G component estimation value calculation processing based on average will be described below. After step S42, the image processing apparatus 40 proceeds to step S44.

In step S41, in a case where the pixel-of-interest (x, y) is not a G pixel (step S41: No), the correction amount calculation unit 441 executes G component estimation value calculation processing based on a similarity level (step S43), that is, processing of calculating the estimation value of the G component based on the similarity level of the pixel value of the pixel-of-interest (x, y). Details of the G component estimation value calculation processing based on a similarity level will be described below. After step S43, the image processing apparatus 40 proceeds to step S44.

Subsequently, the correction amount calculation unit 441 multiplies the G component estimation value for the pixel-of-interest (x, y) estimated in the above-described step S42 or S43 by the G component correction coefficient of the pixel-of-interest (x, y) to calculate the correction amount of the G component for the pixel value of the pixel-of-interest (x, y) (step S44). After step S44, the image processing apparatus 40 returns to the subroutine of the correction amount calculation processing in FIG. 3.

B Component Correction Amount Calculation Processing

Figure 6:
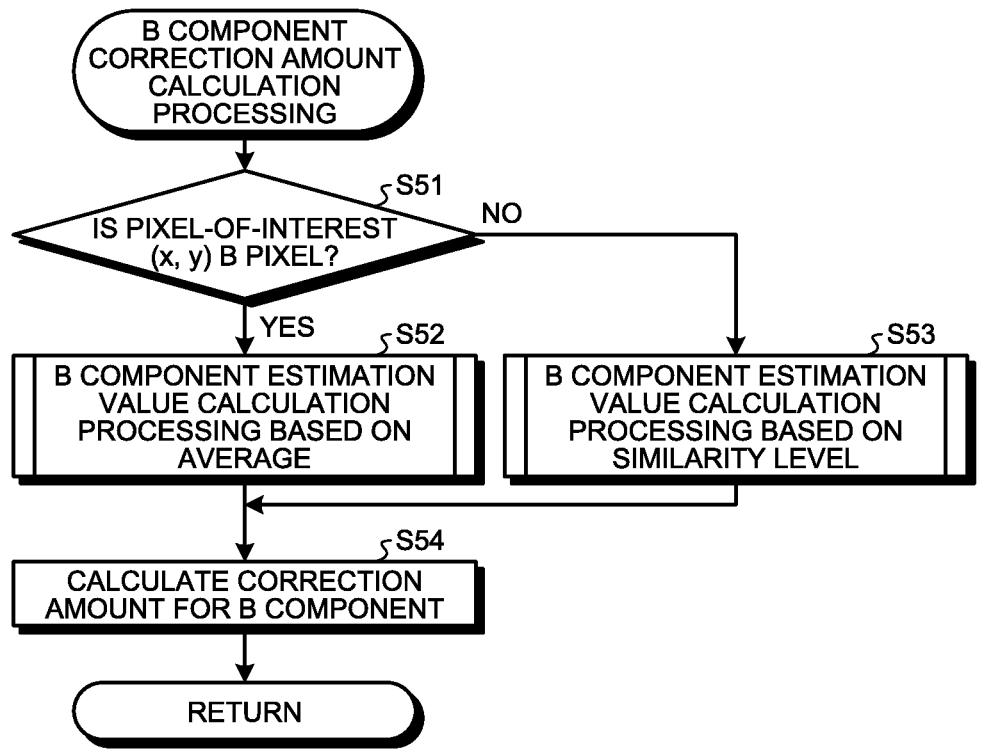
FIG. 6 is a flowchart illustrating an outline of B component correction amount calculation processing in FIG. 3.

Next, details of the B component correction amount calculation processing described in step S15 of FIG. 3 will be described. FIG. 6 is a flowchart illustrating an outline of B component correction amount calculation processing.

As illustrated in FIG. 6, in a case where the pixel-of-interest (x, y) is a B pixel (step S51: Yes), the correction amount calculation unit 441 first executes B component estimation value calculation processing based on average (step S52), that is, processing of calculating an estimation value of the B component based on the average value of the pixel value of the pixels surrounding the pixel-of-interest (x, y). Details of the B component estimation value calculation processing based on average will be described below. After step S52, the image processing apparatus 40 proceeds to step S54.

In step S51, in a case where the pixel-of-interest (x, y) is not a B pixel (step S51: No), the correction amount calculation unit 441 executes B component estimation value calculation processing based on a similarity level (step S53), that is, processing of calculating the estimation value of the B component based on the similarity level of the pixel value of the pixel-of-interest (x, y). Details of the B component estimation value calculation processing based on a similarity level will be described below. After step S53, the image processing apparatus 40 proceeds to step S54.

Subsequently, the correction amount calculation unit 441 multiplies the B component estimation value for the pixel-of-interest (x, y) estimated in the above-described step S52 or S53 by the B component correction coefficient of the pixel-of-interest (x, y) to calculate the correction amount of the B component for the pixel value of the pixel-of-interest (x, y) (step S54). After step S54, the image processing apparatus 40 returns to the subroutine of the correction amount calculation processing in FIG. 3.

While the correction amount calculation unit 441 calculates the correction amount of all the components for all the pixels as described above with reference to FIGS. 3 to 6, it is also allowable to calculate the correction amount for the pixel and a color component of a specific color.

R Component Estimation Value Calculation Processing Based on Average

Figure 7:
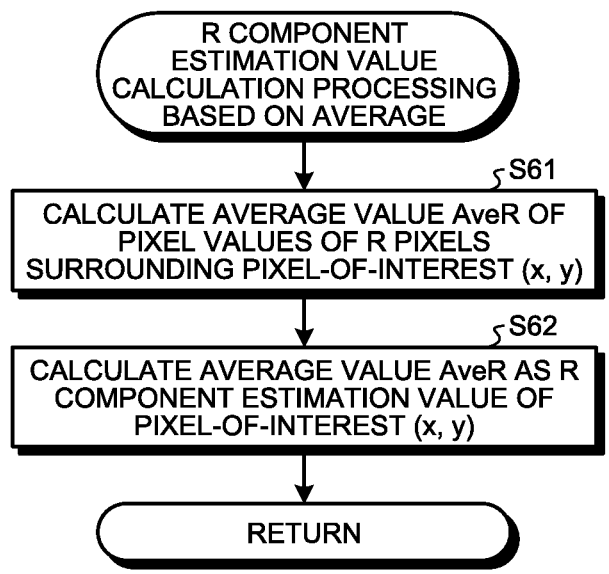
FIG. 7 is a flowchart illustrating an outline of R component estimation value calculation processing based on average in FIG. 4.

Next, details of the R component estimation value calculation processing based on average described in step S32 of FIG. 4 will be described. FIG. 7 is a flowchart illustrating an outline of the R component estimation value calculation processing based on average.

As illustrated in FIG. 7, the correction amount calculation unit 441 first calculates an average value AveR of pixel values of R pixels surrounding the pixel-of-interest (x, y) (step S61). Herein, "surrounding" refers to a range of M×N pixels (M and N are odd numbers of 3 or more, except that M=N=3 is excluded for the R component and the B-component) with respect to the pixel-of-interest (x, y) as a center. Note that the correction amount calculation unit 441 may calculate the average value AveR including the pixel value of the pixel-of-interest (x, y). Alternatively, the correction amount calculation unit 441 may calculate a statistical value in addition to the average value. For example, the correction amount calculation unit 441 may calculate any of a weighted average value, a median value, and the above-mentioned statistical values excluding the correction coefficient whose absolute value is a fixed value or above.

Subsequently, the correction amount calculation unit 441 calculates the average value AveR calculated in the above-described step S61 as an R component estimation value of the pixel-of-interest (x, y) (step S62). After step S62, the image processing apparatus 40 returns to the R component correction amount calculation processing in FIG. 4. In the first embodiment, the G component estimation value calculation processing based on average in step S42 of FIG. 5 and the B component estimation value calculation processing based on average in step S52 of FIG. 6 may be used to respectively calculate the G component estimation value or the B component estimation value by substituting the R component with the G component and B component and by performing similar processing to the processing described above. Accordingly, description of the G component estimation value calculation processing based on average and the B component estimation value calculation processing based on average will be omitted.

R Component Estimation Value Calculation Processing by Similarity Level

Figure 8:
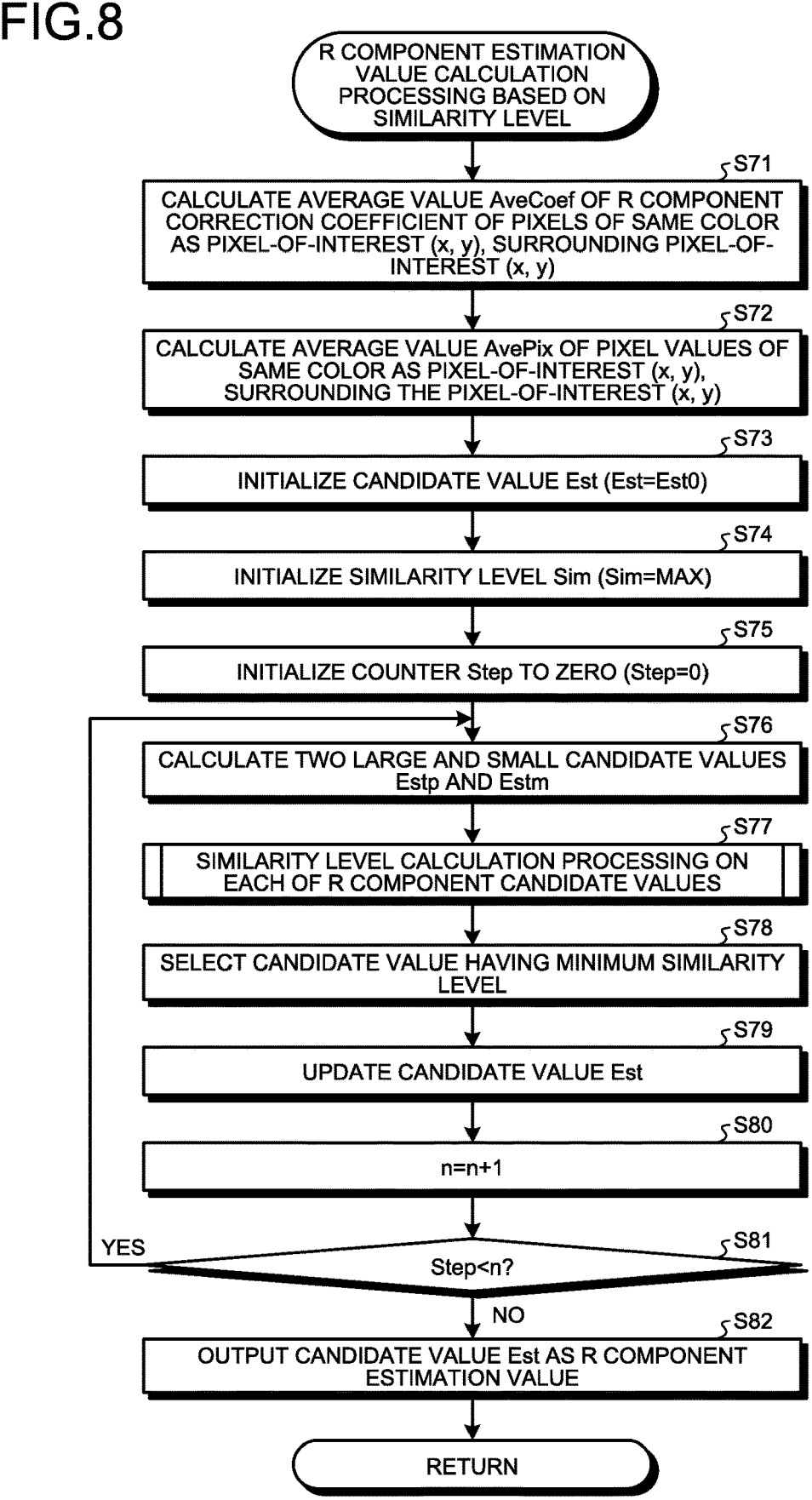
FIG. 8 is a flowchart illustrating an outline of R component estimation value calculation processing based on a similarity level in FIG. 4.
Figure 9:
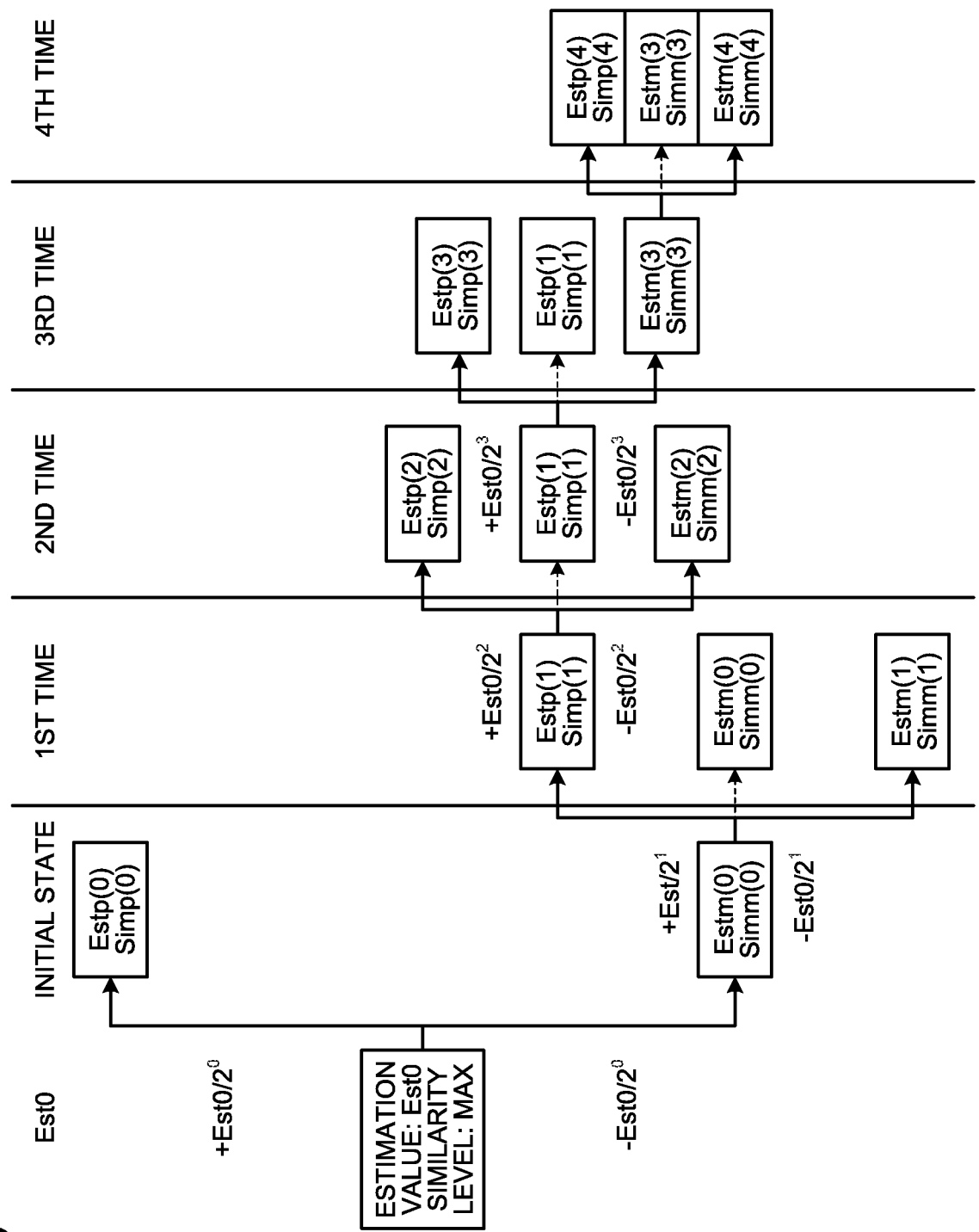
FIG. 9 is a diagram schematically illustrating a method for calculating an R component estimation value calculated by a correction amount calculation unit of the image processing apparatus according to the first embodiment.

Next, details of the R component estimation value calculation processing based on a similarity level described in step S33 of FIG. 4 will be described. FIG. 8 is a flowchart illustrating an outline of the R component estimation value calculation processing based on a similarity level. FIG. 9 is a diagram schematically illustrating a method of calculating the R component estimation value to be calculated by the correction amount calculation unit 441.

As illustrated in FIG. 8, the correction amount calculation unit 441 calculates an average value AveCoef of the R component correction coefficient of the pixels of a same color as the pixel-of-interest (x, y), surrounding the pixel-of-interest (x, y) (step S71). In the following description, the pixel of a same color as the pixel-of-interest (x, y), surrounding the pixel-of-interest (x, y) will be referred to as a reference pixel. The term surrounding means a range similar to the range in step S61 in FIG. 7 described above. In the first embodiment, the reference pixel functions as the surrounding pixel of a same color.

Subsequently, the correction amount calculation unit 441 calculates an average value AvePix of pixel values of the pixels of a same color as the pixel-of-interest (x, y), surrounding the pixel-of-interest (x, y) (step S72). In this case, the correction amount calculation unit 441 calculates the average value AvePix from the pixel values of the above-described reference pixels.

Thereafter, the correction amount calculation unit 441 initializes a candidate value Est (Est=Est 0) (step S73). In this case, the correction amount calculation unit 441 desirably sets a maximum possible value Est 0 for a pixel value input to the spectral sensitivity variation correction unit 44 as the candidate value Est.

Subsequently, the correction amount calculation unit 441 initializes a similarity level Sim (Sim=MAX) (step S74). In this case, the correction amount calculation unit 441 sets a maximum possible value for the similarity level Sim. The similarity level Sim is defined such that the more similar (the higher the similarity level), the smaller the value, that is, the less similar (the lower the similarity level), the larger the value.

Thereafter, the correction amount calculation unit 441 initializes a counter Step to zero (Step=0) (step S75).

Subsequently, the correction amount calculation unit 441 calculates two large and small candidate values Estp and Estm (step S76). Specifically, as illustrated in FIG. 9, the correction amount calculation unit 441 calculates the two large and small candidate values Estp and Estm for the candidate value Est by the following Formulas (1) and (2).

$$\text{Est}p = \text{Est} + (\text{Est}0/2^{Step}) \qquad (1)$$

$$\text{Est}m = \text{Est} - (\text{Est}0/2^{Step}) \qquad (2)$$

Thereafter, the correction amount calculation unit 441 executes the similarity level calculation processing for each of R component candidate values, that is, processing of calculating the similarity level in the estimation value of each of R components (step S77).

Figure 10:
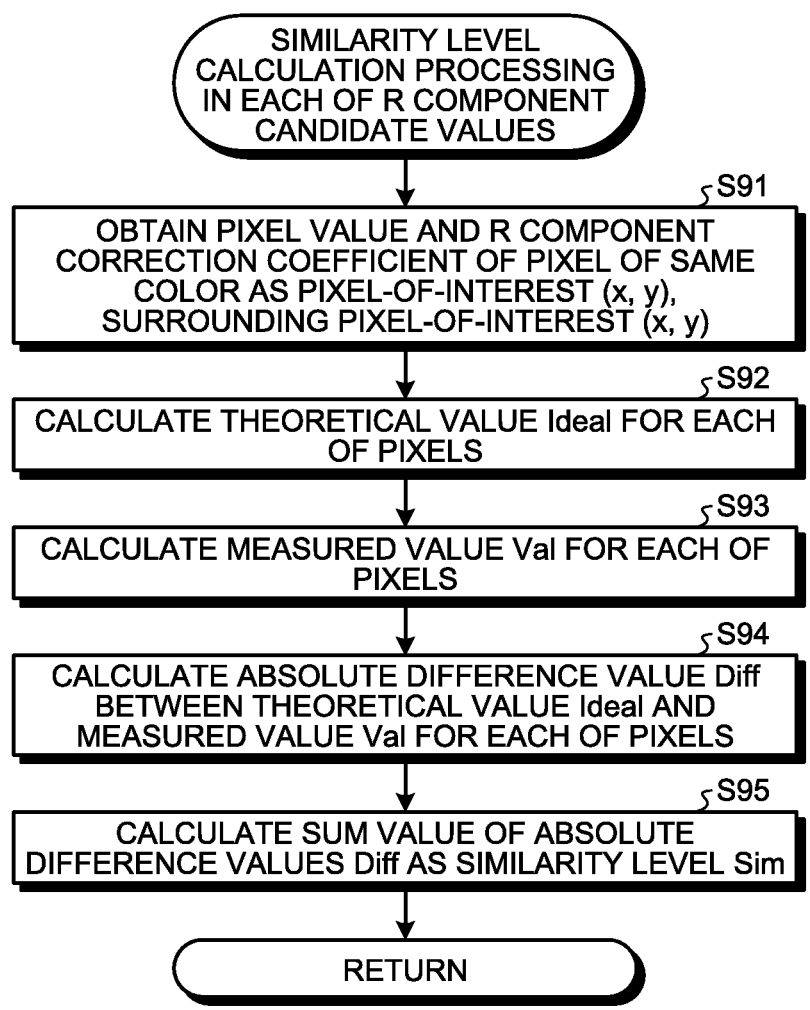
FIG. 10 is a flowchart illustrating an outline of similarity level calculation processing in individual R component candidate values in FIG. 8.

Similarity Level Calculation Processing for Each of R Component Estimation Values FIG. 10 is a flowchart illustrating an outline of the similarity level calculation processing for each of R component candidate values described in step S77 of FIG. 8.

As illustrated in FIG. 10, the correction amount calculation unit 441 first obtains a pixel value and an R component correction coefficient of the pixel of a same color as the pixel-of-interest (x, y), surrounding the pixel-of-interest (x, y) from the second buffer unit 422 (step S91). Specifically, the correction amount calculation unit 441 obtains a pixel value and an R component correction coefficient of the reference pixel from the second buffer unit 422.

Subsequently, the correction amount calculation unit 441 calculates a theoretical value Ideal for each of the pixels (step S92). Specifically, for the reference pixel (x+Δx, y+Δy) obtained in the above-described step S91, the correction amount calculation unit 441 calculates a value obtained by multiplying a difference between the R component correction coefficient CoefR (x+Δx, y+Δy) and the average value AveCoef of the R component correction coefficient calculated in step S71 of FIG. 8 by the R component candidate value Est, as a theoretical value Ideal (x+Δx, y+Δy), for each of the pixels. More specifically, the correction amount calculation unit 441 calculates the theoretical value Ideal (x+Δx, y+Δy) for each of the pixels by the following Formula (3).

$$\text{Ideal}(x+\Delta x, y+\Delta y) = (\text{Coef}R(x+\Delta x, y+\Delta y) - \text{AveCoef}) \times \text{Est} \qquad (3)$$

Thereafter, the correction amount calculation unit 441 calculates a measured value Val for each of the pixels (step S93). Specifically, for the reference pixel (x+Δx, y+Δy), the correction amount calculation unit 441 calculates a difference between a pixel value Pix (x+Δx, y+Δy) and the average value AvePix of the pixel value calculated in step S72 of FIG. 8, as the measured value Val (x+Δx, y+Δy) for each of the pixels. More specifically, the correction amount calculation unit 441 calculates the measured value Val (x+Δx, y+Δy) for each of the pixels by the following Formula (4).

$$\text{Val}(x+\Delta x, y+\Delta y) = \text{Pix}(x+\Delta x, y+\Delta y) - \text{AvePix} \qquad (4)$$

Subsequently, the correction amount calculation unit 441 calculates an absolute difference value Diff between the theoretical value Ideal and the measured value Val for each of the pixels (step S94). Specifically, the correction amount calculation unit 441 calculates, for the pixel (x+Δx, y+Δy), the absolute difference value Diff (x+Δx, y+Δy) between the theoretical value Ideal (x+Δx, y+Δy) and the measured value Val (x+Δx, y+Δy) for each of the pixels. More specifically, the correction amount calculation unit 441 calculates the absolute difference value Diff (x+Δx, y+Δy) for each of the pixels by the following Formula (5).

$$\text{Diff}(x+\Delta x, y+\Delta y) = |(\text{Val}(x+\Delta x, y+\Delta y) - \text{Ideal}(x+\Delta x, y+\Delta y)| \quad (5)$$

Alternatively, the correction amount calculation unit 441 may calculate a squared difference value as Diff (x+Δx, y+Δy) by the following Formula (6), instead of calculating the absolute difference value Diff (x+Δx, y+Δy).

$$\text{Diff}(x+\Delta x, y+\Delta y) = ((\text{Val}(x+\Delta x, y+\Delta y) - \text{Ideal}(x+\Delta x, y+\Delta y))^2 \quad (6)$$

Thereafter, the correction amount calculation unit 441 calculates a sum value of the absolute difference values Diff of all the reference pixels as the similarity level Sim (step S95). Alternatively, the correction amount calculation unit 441 may calculate a weighted sum instead of a simple sum of the absolute difference values of all the reference pixels. For example, in a case of performing weighting, the correction amount calculation unit 441 may calculate the sum of the absolute difference values of all the reference pixels while changing the weighting coefficient in accordance with a distance of each of the pixels from the pixel-of-interest (x, y). Moreover, in a case where weighting is performed, the correction amount calculation unit 441 may calculate the sum of the absolute difference values of all the reference pixels while changing the weighting coefficients such that the larger the absolute difference value Diff, the larger the weighting (equivalent to transforming the absolute difference value Diff with a monotonically increasing function to calculate the sum of absolute difference values). After step S95, the image processing apparatus 40 returns to the R component estimation value calculation processing based on a similarity level in FIG. 8.

In this manner, in the similarity level calculation processing for each of R component estimation values, the correction amount calculation unit 441 calculates the similarity degree between the pixel value distribution and the theoretical value distribution by the sum of the absolute difference values or the sum of the squared difference values and defines this as the evaluation value. The estimation value, however, may be calculated by another method. For example, the correction amount calculation unit 441 may calculate the evaluation value using normalized cross-correlation (NCC), zero-mean normalized cross-correlation (ZNCC) or the like. Note that regarding the G component and the B component, by substituting the R component with the G component or the B component and performing similar processing as above, it is possible to calculate the similarity level in the estimation value of each of the G components and the similarity level in the estimation value of each of the B components. Accordingly, description of similarity level calculation processing in each of the G component estimation values and similarity level calculation processing in each of the B component estimation values will be omitted. This processing is performed for each of the candidate values Est, Estp, Estm so as to calculate three similarity levels Sim, Simp, and Simm, respectively.

Returning to FIG. 8, step S78 and subsequent processing will be described.

In step S78, the correction amount calculation unit 441 selects a candidate value having the minimum similarity level. Specifically, the correction amount calculation unit 441 calculates (selects) candidate values (any of Est, Estp, and Estm) corresponding to the minimum similarity level among the three similarity levels Sim, Simp, and Simm. Specifically, as illustrated in FIG. 9, the correction amount calculation unit 441 selects a candidate value at a minimum in comparison with three similarity levels, namely, two (large and small) similarity levels and the current similarity level, and repeats this processing to search a candidate value with the minimum similarity level. After step S78, the image processing apparatus 40 proceeds to step S79.

In step S79, the correction amount calculation unit 441 updates the candidate value calculated in step S78 to the candidate value Est. For example, in a case where the candidate value calculated in step S78 is Estp, the correction amount calculation unit 441 sets Est to Estp (Est=Estp).

Thereafter, the correction amount calculation unit 441 increments n (n=n+1) (step S80).

Subsequently, in a case where the counter Step is smaller than n (Step<n) (step S81: Yes), the image processing apparatus 40 returns to the above-described step S76. In contrast, in a case where the counter Step is not smaller than n (step S81: No), the image processing apparatus 40 proceeds to step S82. Here, n is desirably a value such that Est $0 \div 2^n$ is 1 or more.

In step S82, the correction amount calculation unit 441 calculates the candidate value Est as an R component estimation value. After step S82, the image processing apparatus 40 returns to the R component correction amount calculation processing in FIG. 4.

In this manner, the R component estimation value calculation processing based on a similarity level as described above does not use the pixel values of different-color pixels surrounding the pixel-of-interest, and thus, the correction amount calculation unit 441 may calculate an estimation value of a color component at the pixel-of-interest, different from the color component of the pixel-of-interest, even when a pixel of a different color is saturated.

Specifically, according to the first embodiment, the correction amount calculation unit 441 uses R component estimation value calculation processing to select a candidate value at a minimum in comparison with three similarity levels, namely, two (large and small) similarity levels and the current similarity level, and repeats this processing to search a candidate value with the minimum similarity level. With this configuration, the correction amount calculation unit 441 does not use the pixel values of different-color pixels surrounding the pixel-of-interest, making it possible to calculate an estimation value of a color component at the pixel-of-interest, different from the color component of the pixel-of-interest, even when a pixel of a different color is saturated. Note that the correction amount calculation unit 441 may search a candidate value having the highest similarity level by another method. For example, the correction amount calculation unit 441 may use a method of comprehensively arrange a candidate value to search for a value with the highest similarity level, a known hill climbing method, a local search method, or the like. In the first embodiment, the G component estimation value calculation processing by similarity level in step S43 of FIG. 5 and the B component estimation value calculation processing by similarity level in step S53 of FIG. 6 may be used to respectively calculate the G component estimation value or the B component estimation value by substituting the R component with the G component and B component and by performing similar processing to the processing described above. Accordingly, description of the G component estimation value calculation processing based on a similarity level and the B component estimation value calculation processing based on a similarity level will be omitted.

Correction Amount Calculation Processing for Pixel Value of Pixel-of-Interest (x, y)

Figure 11:
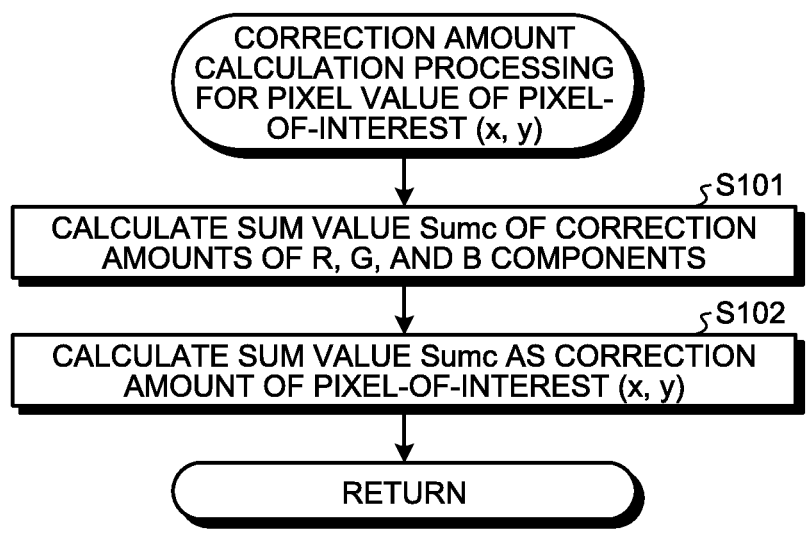
FIG. 11 is a flowchart illustrating an outline of correction amount calculation processing for a pixel value of a pixel-of-interest (x, y) in FIG. 3.

Next, the correction amount calculation processing for the pixel value of the pixel-of-interest (x, y) described in step S16 in FIG. 3 will be described. FIG. 11 is a flowchart illustrating an outline of the correction amount calculation processing for the pixel value of the pixel-of-interest (x, y).

As illustrated in FIG. 11, the correction amount calculation unit 441 first calculates a sum value Sumc of the correction amounts of the R, G, and B components calculated respectively in each of steps S13, S14, and S15 in FIG. 3 (step S101).

Subsequently, the correction amount calculation unit 441 calculates the sum value Sumc calculated in the above-described step S101 as a correction amount of the pixel-of-interest (x, y) (step S102). After step S102, the image processing apparatus 40 returns to the correction amount calculation processing of FIG. 3.

The above-described first embodiment does not use the pixel values of different-color pixels surrounding the pixel-of-interest, and thus, the correction amount calculation unit 441 may calculate an estimation value of a color component at the pixel-of-interest, different from the color component of the pixel-of-interest, even when a pixel of a different color is saturated.

Modification of First Embodiment

Next, a modification of the first embodiment will be described. A modification of the first embodiment has a similar configuration as the imaging system 1 according to the first embodiment described above, with a different manner of performing correction amount calculation processing on the pixel value of the pixel-of-interest (x, y) executed by the image processing apparatus. Specifically, the modification of the first embodiment is configured to prevent excessive correction and erroneous correction. Hereinafter, correction amount calculation processing for the pixel value of the pixel-of-interest (x, y) executed by the image processing apparatus according to the modification of the first embodiment will be described. A same reference sign will be given to the configuration identical to the configuration of the imaging system 1 according to the above-described first embodiment, and description for this will be omitted.

Correction Amount Calculation Processing for Pixel Value of Pixel-of-Interest (x, y)

Figure 12:
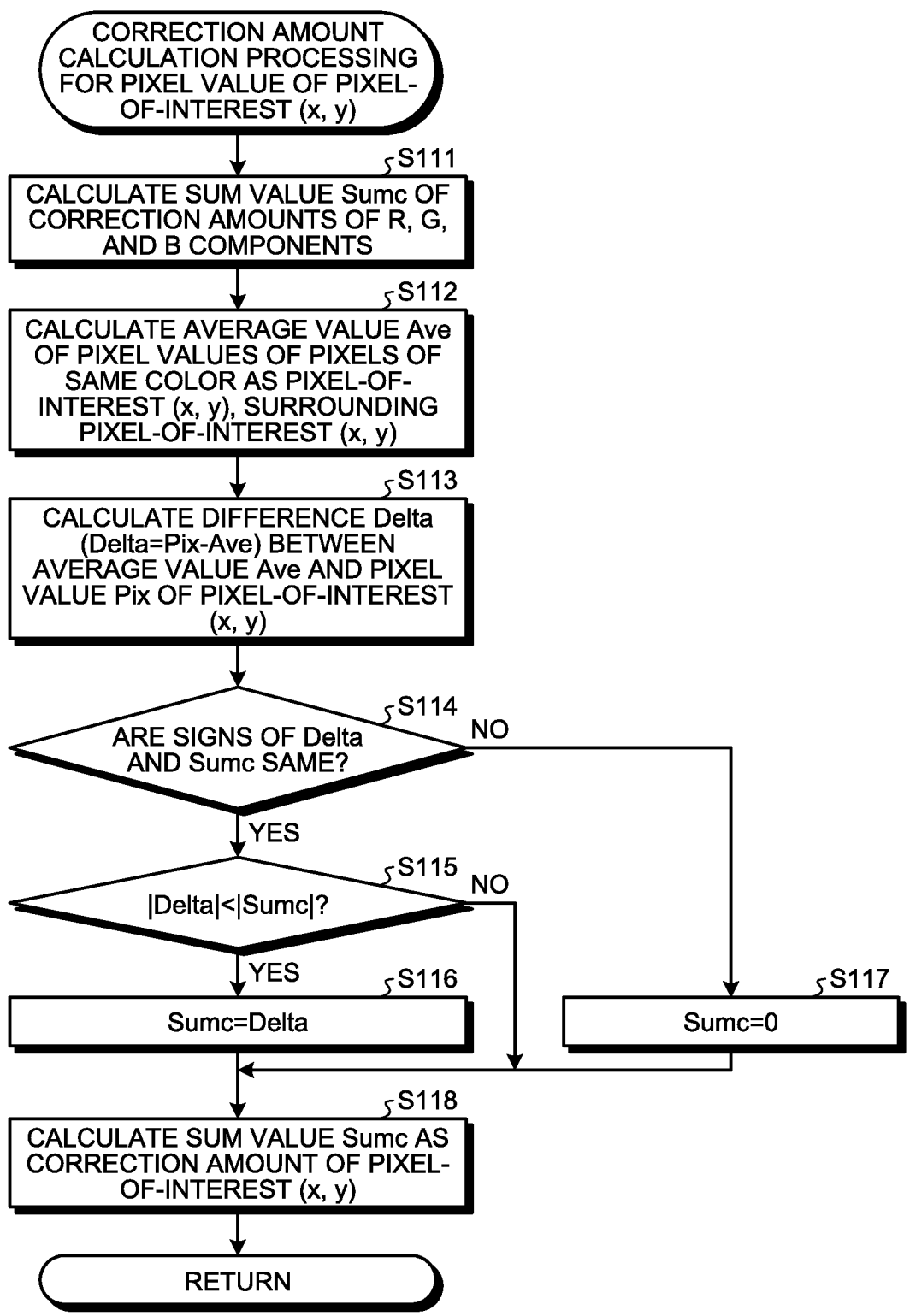
FIG. 12 is a flowchart illustrating an outline of a correction amount calculation processing for a pixel value of a pixel-of-interest (x, y) according to a modification of the first embodiment.

FIG. 12 is a flowchart illustrating an outline of the correction amount calculation processing for the pixel value of the pixel-of-interest (x, y) executed by the image processing apparatus according to the modification of the first embodiment.

As illustrated in FIG. 12, the correction amount calculation unit 441 first calculates the sum value Sumc of the correction amounts of the R, G, and B components calculated respectively in each of steps S13, S14, and S15 in FIG. 3 (step S111).

Subsequently, the correction amount calculation unit 441 calculates an average value Ave of pixel values of the pixels of a same color as the pixel-of-interest (x, y), surrounding the pixel-of-interest (x, y) (step S112). In this case, the correction amount calculation unit 441 preferably uses the same pixel as the pixel of a same color for which the average value AvePix has been calculated in step S72 in FIG. 8.

Thereafter, the correction amount calculation unit 441 calculates a difference Delta (Delta=Pix−Ave) between the average value Ave calculated in step S112 and the pixel value Pix of the pixel-of-interest (x, y) (step S113).

Subsequently, in a case where the signs of Delta and Sumc are the same (step S114: Yes), and when |Delta|<|Sumc| is satisfied (step S115: Yes), the correction amount calculation unit 441 sets Sumc as Delta (Sumc=Delta) (step S116). After step S116, the image processing apparatus 40 proceeds to step S118 described below.

In step S114, in a case where the signs of Delta and Sumc are the same (step S114: Yes), and when |Delta|<|Sumc| is not satisfied (step S115: No), the image processing apparatus 40 proceeds to step S118 described below.

In step S114, in a case where the signs of Delta and Sumc are not the same (step S114: No), the correction amount calculation unit 441 sets Sumc to "0" (Sumc=0) (step S117). After step S117, the image processing apparatus 40 proceeds to step S118 described below.

Subsequently, the correction amount calculation unit 441 calculates the sum value Sumc as the correction amount of the pixel-of-interest (x, y) (step S118). After step S118, the image processing apparatus 40 returns to the correction amount calculation processing in FIG. 3.

According to the modification of the first embodiment described above, in a case where the signs of Delta and Sumc are not the same, the correction amount calculation unit 441 sets Sumc to "0", and in a case where the signs of Delta and Sumc are the same and when |Delta|<|Sumc| is not satisfied, the correction amount calculation unit 441 does not perform correction, and this suppresses correction of the pixel value of the pixel-of-interest (x, y), making it possible to prevent overcorrection and erroneous correction.

While the first embodiment performs comparison of the signs of Delta and Sumc and determination of |Delta|<|Sumc| to limit the corrected pixel value to a range between Pix and Ave, it is allowable to use another method. For example, the correction amount calculation unit 441 may clip the value obtained by subtracting Sumc from Pix to a range from Ave to Pix in a case where Ave<Pix is satisfied, while it may clip the value obtained by subtracting Sumc from Pix to a range from Pix to Ave in a case where Ave≥Pix is satisfied.

Second Embodiment

Next, a second embodiment will be described. An imaging system according to the second embodiment has a same configuration as the imaging system 1 according to the above-described first embodiment, and the image processing apparatus executes R component correction amount calculation processing in a different manner as in the first embodiment. Specifically, while the above-described first embodiment separately calculate the estimation values of individual color components based on the similarity level, the second embodiment separately calculates the estimation value of individual color components based on a ratio of the pixel value to the correction coefficient. Hereinafter, the R component correction amount calculation processing executed by the image processing apparatus according to the second embodiment will be described. A same reference sign will be given to the configuration identical to the configuration of the imaging system 1 according to the above-described first embodiment, and description for this will be omitted. In the following description, the processing for the R component will be described, and description of the processing of the G component and the B component will be omitted since similar processing is performed also for the G component and the B component.

R Component Correction Amount Calculation Processing

Figure 13:
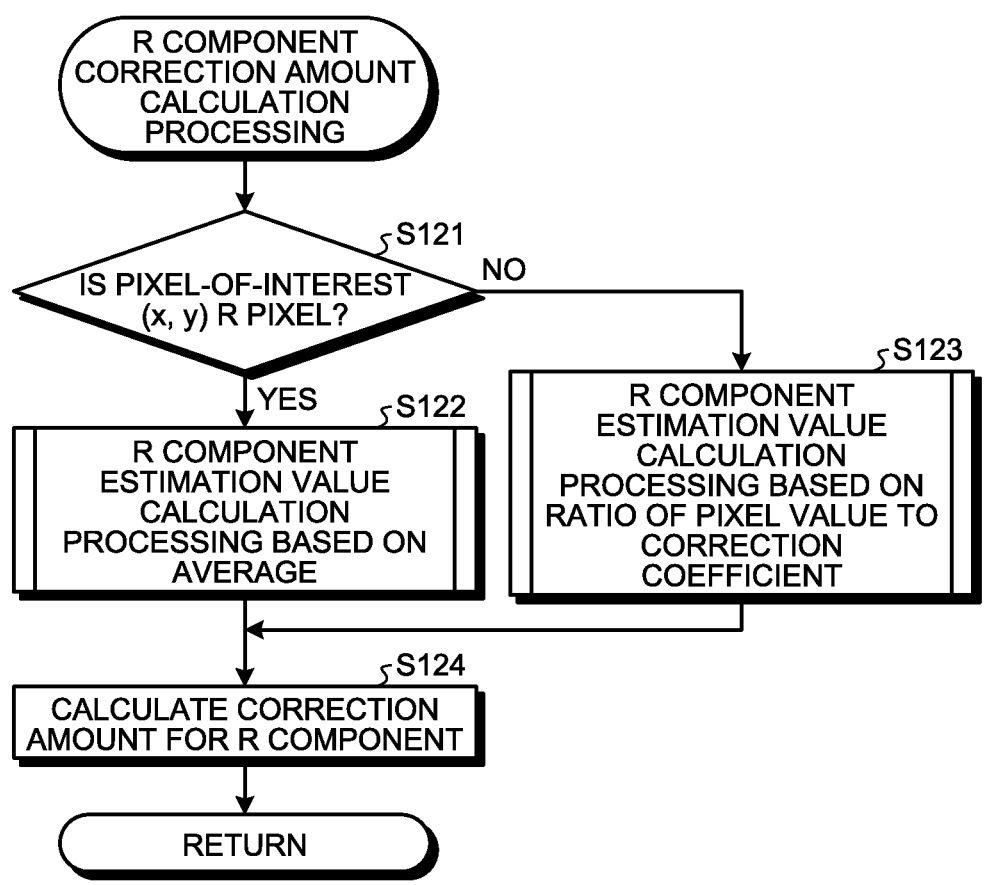
FIG. 13 is a flowchart illustrating an outline of R component correction amount calculation processing executed by an image processing apparatus according to a second embodiment.

FIG. 13 is a flowchart illustrating an outline of R component correction amount calculation processing executed by the image processing apparatus 40 according to the second embodiment. In FIG. 13, steps S121, S122, and S124 correspond to the above-described steps S31, S32, and S34 of FIG. 4, respectively.

In step S123, the correction amount calculation unit 441 executes R component estimation value calculation processing based on the ratio of the pixel value to the correction coefficient, that is, processing of calculating the estimation value of the R component based on the ratio of the pixel value to the correction coefficient. After step S123, the image processing apparatus 40 proceeds to step S124.

Figure 14:
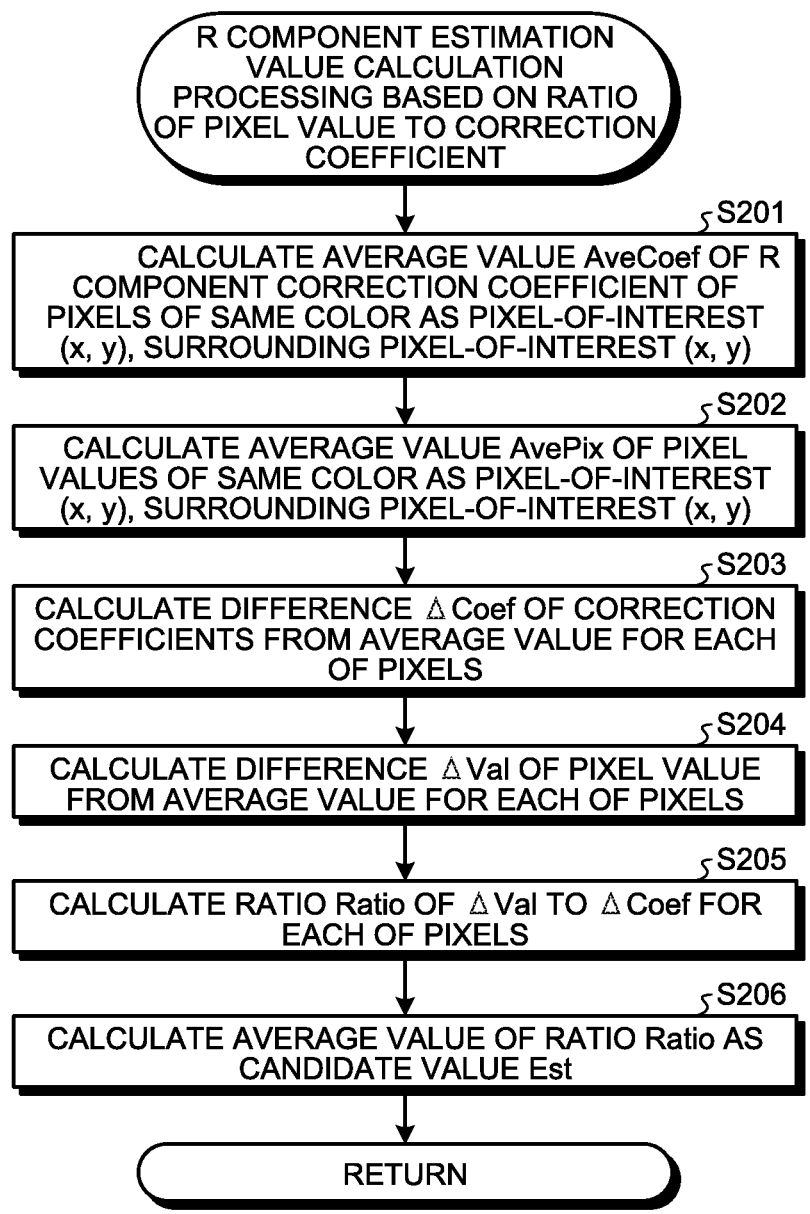
FIG. 14 is a flowchart illustrating an outline of R component estimation value calculation processing based on a ratio of a pixel value to the correction coefficient in FIG. 13.

R Component Estimation Value Calculation Processing by Ratio of Pixel Value to Correction Coefficient FIG. 14 is a flowchart illustrating an outline of the R component estimation value calculation processing based on the ratio of the pixel value to the correction coefficient described in step S123 of FIG. 13. Steps S201 and S202 in FIG. 14 correspond to steps S71 and S72 in above-described FIG. 8, respectively.

In step S203, the correction amount calculation unit 441 calculates a difference $\Delta$Coef of the correction coefficients from the average value for each of the pixels. Specifically, for the reference pixel (x+$\Delta$x, y+$\Delta$y), the correction amount calculation unit 441 calculates the difference $\Delta$Coef (x+$\Delta$x, y+$\Delta$y) between an R component correction amount CoefR (x+$\Delta$x, y+$\Delta$y) and an average value AveCoef of the R component correction coefficient calculated in step S201 for each of the pixels. More specifically, the correction amount calculation unit 441 calculates the difference of the correction coefficient $\Delta$Coef from the average value for each of the pixels by the following Formula (7).

$$\Delta\text{Coef}(x+\Delta x, y+\Delta y) = \text{Coef}R(x+\Delta x, y+\Delta y) - \text{AveCoef} \quad (7)$$

Subsequently, the correction amount calculation unit 441 calculates a difference $\Delta$Val of the pixel value from the average value for each of the pixels (step S204). Specifically, for the reference pixel (x+$\Delta$x, y+$\Delta$y), the correction amount calculation unit 441 calculates a difference $\Delta$Val (x+$\Delta$x, y+$\Delta$y) between a pixel value Pix (x+$\Delta$x, y+$\Delta$y) and the average value AvePix of the pixel value calculated in step S202 for each of the pixels. More specifically, the correction amount calculation unit 441 calculates the difference $\Delta$Val for each of the pixels by the following Formula (8).

$$\Delta\text{Val}(x+\Delta x, y+\Delta y) = \text{Pix}(x+\Delta x, y+\Delta y) - \text{AvePix} \quad (8)$$

Thereafter, the correction amount calculation unit 441 calculates a ratio Ratio of $\Delta$Val to $\Delta$Coef for each of the pixels (step S205). Specifically, for the reference pixel (x+$\Delta$x, y+$\Delta$y), the correction amount calculation unit 441 calculates the ratio Ratio (x+$\Delta$x, y+$\Delta$y) of $\Delta$Val (x+$\Delta$x, y+$\Delta$y) to $\Delta$Coef (x+$\Delta$x, y+$\Delta$y) for each of the pixels. More specifically, the correction amount calculation unit 441 calculates the ratio Ratio (x+$\Delta$x, y+$\Delta$y) for each of the pixels by the following Formula (9).

$$\text{Ratio}(x+\Delta x, y+\Delta y) = \Delta\text{Val}(x+\Delta x, y+\Delta y) / \Delta\text{Coef}(x+\Delta x, y+\Delta y) \quad (9)$$

Note that in a case where $\Delta$Coef (x+$\Delta$x, y+$\Delta$y) is zero, the correction amount calculation unit 441 may perform processing of setting Ratio (x+$\Delta$x, y+$\Delta$y)=0 or processing of excluding processing of the pixel (x+$\Delta$x, y+$\Delta$y). At this time, the correction amount calculation unit 441 excludes the excluded pixels (x+$\Delta$x, y+$\Delta$y) also in next average value calculation processing.

Subsequently, the correction amount calculation unit 441 calculates the average value of the ratio Ratio as the candidate value Est (step S206). Specifically, the correction amount calculation unit 441 calculates the average value of the ratio Ratio of all the reference pixels calculated in step S205 as the candidate value Est. After step S206, the image processing apparatus 40 returns to the R component correction amount calculation processing in FIG. 4. In addition to the average value, the correction amount calculation unit 441 may use a statistical value such as a weighted average value or a median value.

Moreover, the correction amount calculation unit 441 may calculate the average value of the ratio Ratio of the representative reference pixels as the candidate value Est. Herein, the representative reference pixel is, for example, pixels up to a kth pixel from the largest absolute value of the correction coefficient, or the kth pixel from the largest absolute value of the correction coefficient, or the like.

Figure 15:
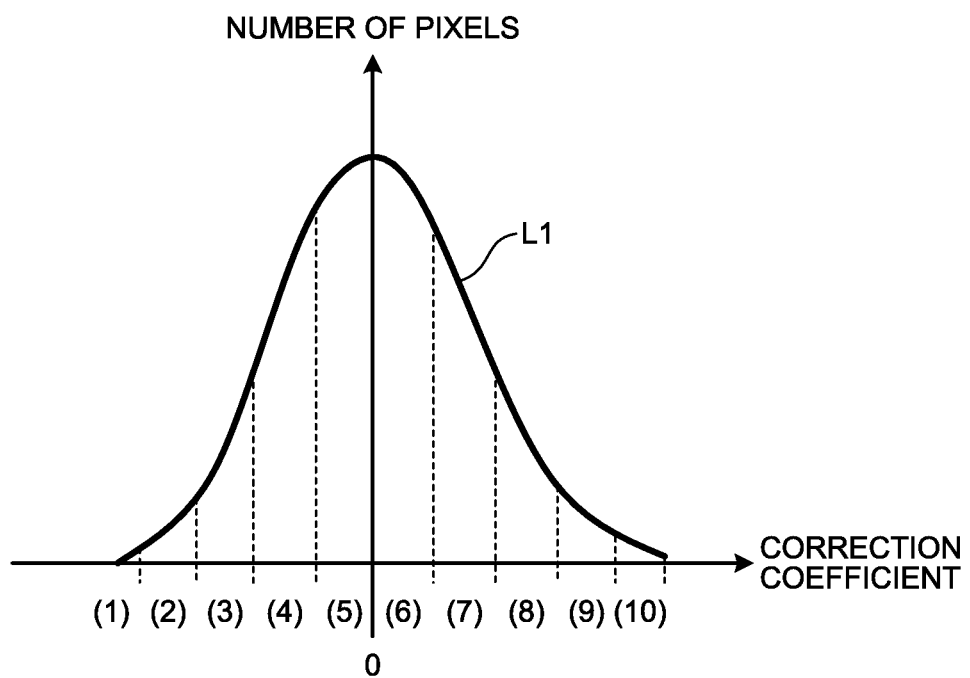
FIG. 15 is a diagram schematically illustrating distribution of correction coefficients similar to each other.

FIG. 15 is a diagram schematically illustrating distribution of correction coefficients similar to each other. In FIG. 15, the horizontal axis represents the correction coefficient and the vertical axis represents the number of pixels. In FIG. 15, a curve L1 indicates the number of pixels with respect to the correction coefficient.

As illustrated in FIG. 15, in comparison of a case of selecting the kth correction coefficient with a small absolute value with a case of selecting the kth correction coefficient with a large absolute value, the proportion of the k errors is small in the case of large absolute value of the correction coefficient, leading to higher accuracy of the estimation value obtained.

Furthermore, the correction amount calculation unit 441 may calculate the average value of the ratio Ratio for each of reference pixels having similar correction coefficient values, and thereafter may calculate the average value as the candidate value Est. This calculation makes it possible to reduce the influence of variation in pixel value due to random noise.

According to the second embodiment described above, the correction amount calculation unit 441 calculates the candidate value Est of the R component based on the ratio of the pixel value to the correction coefficient, and this eliminates a need to search for an estimation value having minimum similarity level as in the above-described first embodiment, making it possible to calculate the candidate value Est by one calculation procedure.

Third Embodiment

Next, a third embodiment will be described. Third embodiment has a same configuration as the imaging system 1 according to the above-described first embodiment, except that an image processing apparatus executes correction amount calculation processing in a different manner as in the first embodiment. Specifically, while the above-described first embodiment separately calculates the estimation value of each of the R component, the B component, and the G component, the third embodiment collectively calculates estimation values of the R component, the B component, and the G component. Hereinafter, correction amount calculation processing executed by the image processing apparatus according to the third embodiment will be described. A same reference sign will be given to the configuration identical to the configuration of the above-described first embodiment, and description thereof will be omitted.

Correction Amount Calculation Processing

Figure 16:
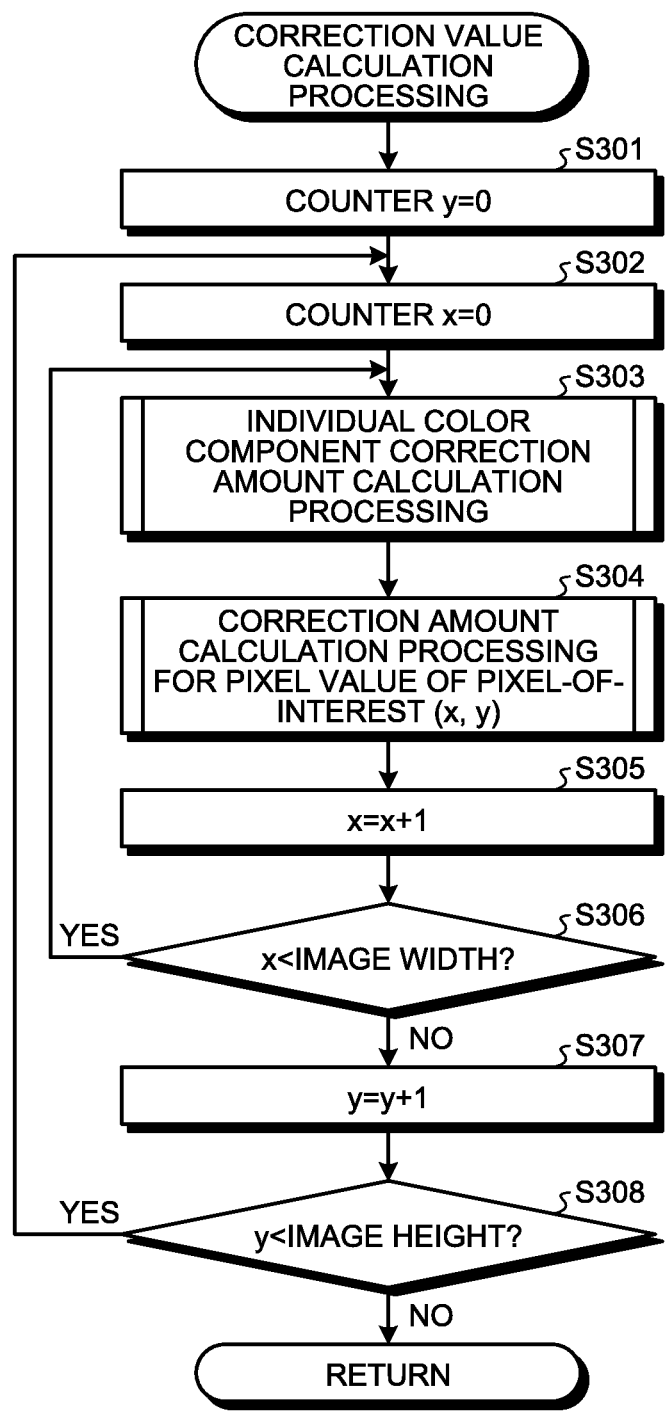
FIG. 16 is a flowchart illustrating an outline of correction amount calculation processing executed by an image processing apparatus according to a third embodiment.

FIG. 16 is a flowchart illustrating an outline of correction amount calculation processing executed by the image processing apparatus 40 according to the third embodiment. In FIG. 16, steps S301, S302, and S304 to S308 correspond to the above-described steps S11, S12, and S16 to S20 of FIG. 3, respectively.

In step S303, the correction amount calculation unit 441 executes individual color component correction amount calculation processing, that is processing of calculating the correction amount of individual color components in the pixel-of-interest (x, y).

Individual Color Component Correction Amount Calculation Processing

Figure 17:
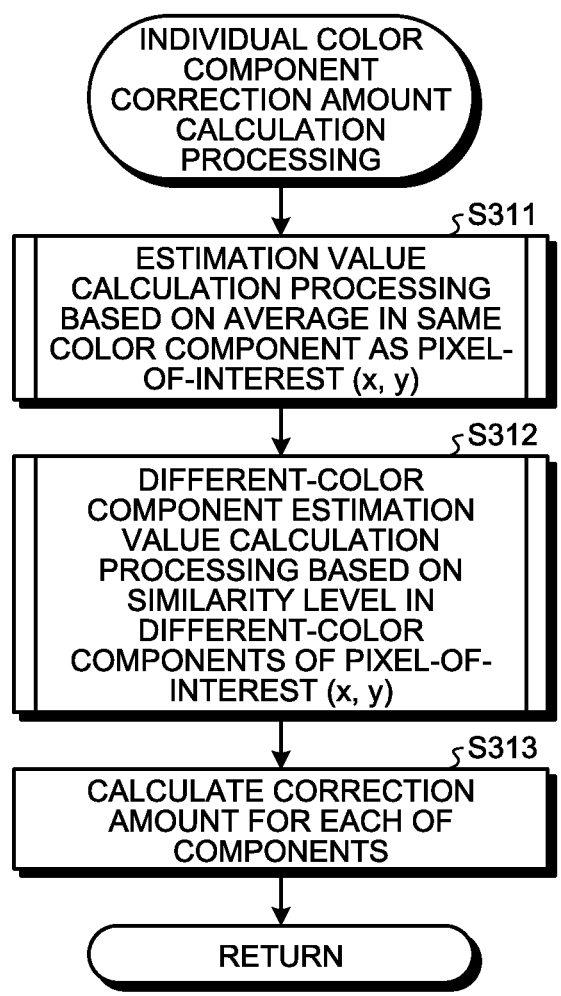
FIG. 17 is a flowchart illustrating an outline of individual color component correction amount calculation processing in FIG. 16.

FIG. 17 is a flowchart illustrating an outline of individual color component correction amount calculation processing in step S303 in FIG. 16.

As illustrated in FIG. 17, the correction amount calculation unit 441 first executes estimation value calculation processing based on average for a same color component as the pixel-of-interest (x, y) (step S311). Specifically, the correction amount calculation unit 441 performs, in accordance with the color component of the pixel-of-interest (x, y), any of: the R component estimation value calculation processing based on average in step S32 in the R component correction amount calculation processing of FIG. 4; the G component estimation value calculation processing based on average in step S42 in the G component correction amount calculation processing of FIG. 5; and the B component estimation value calculation processing based on average in step S52 in the B component correction amount calculation processing of FIG. 6 described above.

Subsequently, the correction amount calculation unit 441 executes different-color component estimation value calculation processing based on a similarity level for different-color components of the pixel-of-interest (x, y) (step S312). For example, in a case where the pixel-of-interest (x, y) is a G pixel, the correction amount calculation unit 441 calculates estimation values of the R component and the B component. Details of the different-color component estimation value calculation processing for the different-color component of the pixel-of-interest (x, y) based on a similarity level will be described below.

Thereafter, the correction amount calculation unit 441 calculates the correction amount of individual color components (step S313). Specifically, the correction amount calculation unit 441 multiplies the estimation value of individual color components of the pixel-of-interest (x, y) by the correction coefficient to calculate the correction amount of individual color components with respect to the pixel value of the pixel-of-interest (x, y). After step S313, the image processing apparatus 40 returns to the correction amount calculation processing of FIG. 16.

Different-Color Component Estimation Value Calculation Processing Based on a Similarity Level for Different-Color Component of Pixel-of-Interest (x, y)

Figure 18:
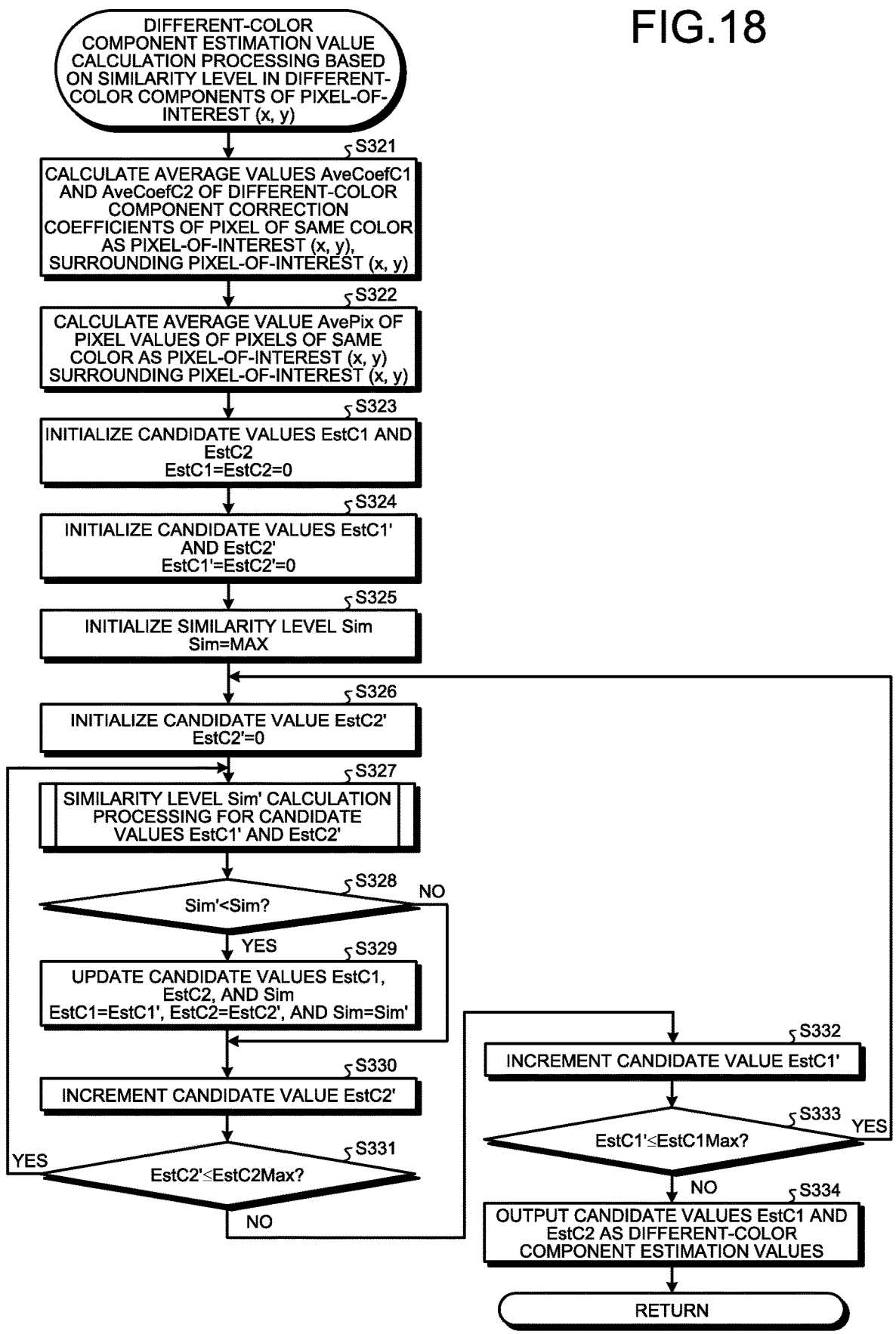
FIG. 18 is a flowchart illustrating an outline of different-color component estimation value calculation processing based on a similarity level for different-color components of the pixel-of-interest (x, y) in FIG. 17.

Next, different-color component estimation value calculation processing based on a similarity level for the different-color component of the pixel-of-interest (x, y) described in step S312 of FIG. 17 will be described. FIG. 18 is a flowchart illustrating an outline of different-color component estimation value calculation processing based on a similarity level for different color components of the pixel-of-interest (x, y).

As illustrated in FIG. 18, the correction amount calculation unit 441 calculates an average value AveCoefC1 and an average value AveCoefC2 of the different-color component correction coefficients of the pixel of a same color as the pixel-of-interest (x, y), surrounding the pixel-of-interest (x, y) (Step S321). Specifically, the correction amount calculation unit 441 defines the different-color pixels as the C1 and C2 and defines the average values of the correction coefficients of the different-color pixels C1 and C2 as AveCoefC1 and AveCoefC2, respectively.

Subsequently, the correction amount calculation unit 441 calculates an average value AvePix of pixel values of the pixels of a same color as the pixel-of-interest (x, y) surrounding the pixel-of-interest (x, y) (step S322). In this case, the correction amount calculation unit 441 desirably calculates the average value AvePix of the pixel values from the pixel value of the reference pixel. At this time, the correction amount calculation unit 441 may calculate a statistical value in addition to the average value. For example, the correction amount calculation unit 441 may calculate a weighted average value, a median value, or the like.

Thereafter, the correction amount calculation unit 441 initializes a candidate value EstC1 and a candidate value EstC2 (EstC1=EstC2=0) (step S323), and initializes a candidate value EstC1' and a candidate value EstC2' (EstC1'=EstC2'=0) (step S324).

Subsequently, the correction amount calculation unit 441 initializes the similarity level Sim (Sim=MAX) (step S325) and initializes the candidate value EstC2' (EstC2'=0) (step S326).

Thereafter, the correction amount calculation unit 441 executes similarity level Sim' calculation processing in the candidate values EstC1' and EstC2', that is, processing of calculating a similarity level Sim' in the candidate value EstC1' and the candidate value EstC2' (step S327).

Similarity Level Sim' Calculation Processing for Candidate Values EstC1' and EstC2'

Figure 19:
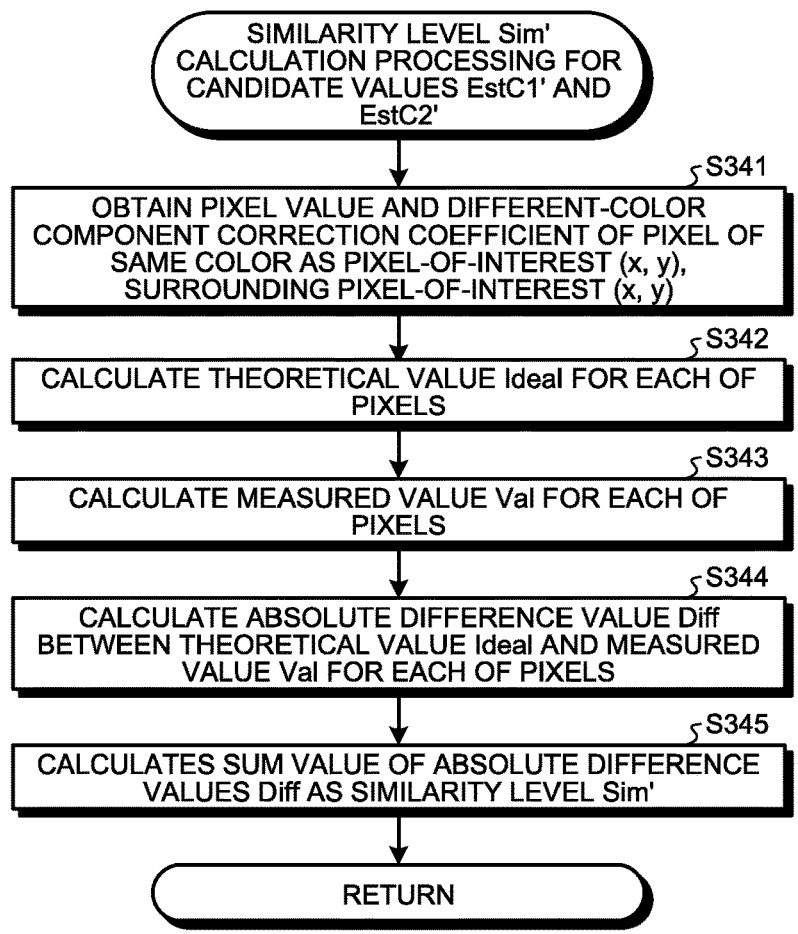
FIG. 19 is a flowchart illustrating an outline of similarity level Sim' calculation processing in candidate values EstC1' and EstC2' in FIG. 18.

FIG. 19 is a flowchart illustrating an outline of the similarity level Sim' calculation processing in the candidate values EstC1' and EstC2' described in step S327 of FIG. 18.

As illustrated in FIG. 19, the correction amount calculation unit 441 first outputs a pixel value and a different-color component correction coefficient of the pixel of a same color as the pixel-of-interest (x, y), surrounding the pixel-of-interest (x, y) from the second buffer unit 422 (step S341).

Subsequently, the correction amount calculation unit 441 calculates the theoretical value Ideal for each of the pixels (step S342). Specifically, the correction amount calculation unit 441 calculates, on the reference pixel (x+Δx, y+Δy), the theoretical value Ideal by first calculating a difference between the correction coefficient CoefC1 (x+Δx, y+Δy) of the C1 component and the correction coefficient CoefC2 (x+Δx, y+Δy) of the C2 component, and the average values AveCoefC1 and AveCoefC2 of the different-color component correction coefficients calculated in step S321 of FIG. 18 described above. The obtained difference is then respectively multiplied by the input different-color component candidate values EstC1' and EstC2', and the obtained values are added to each other to obtain the theoretical value Ideal (x+Δx, y+Δy). More specifically, the correction amount calculation unit 441 calculates the theoretical value Ideal (x+Δx, y+Δy) for each of the pixels by the following Formula (10).

$$\text{Ideal}(x + \Delta x, y + \Delta y) = \qquad (10)$$
$$(CoefC1\,(x + \Delta x, y + \Delta y) - AveCoefC1) \times EstC1' +$$
$$(CoefC2\,(x + \Delta x, y + \Delta y) - AveCoefC2) \times EstC2'$$

Thereafter, the correction amount calculation unit 441 calculates a measured value Val for each of the pixels (step S343). Specifically, on the reference pixel (x+Δx, y+Δy), the correction amount calculation unit 441 calculates a difference between a pixel value Pix (x+Δx, y+Δy) and the average value AvePix of the pixel value calculated in step S322 of FIG. 18, as the measurement Val (x+Δx, y+Δy). More specifically, the correction amount calculation unit 441 calculates the measurement Val (x+Δx, y+Δy) for each of the pixels by the following Formula (11).

$$\text{Val}(x+\Delta x, y+\Delta y) = \text{Pix}(x+\Delta x, y+\Delta y) - \text{AvePix} \qquad (11)$$

Subsequently, the correction amount calculation unit 441 calculates an absolute difference value Diff between the theoretical value Ideal and the measured value Val for each of the pixels (step S344). Specifically, in the pixel (x+Δx, y+Δy), the correction amount calculation unit 441 calculates the absolute difference value Diff (x+Δx, y+Δy) between the theoretical value Ideal (x+Δx, y+Δy) calculated in the above-described step S342 and the measured value Val (x+Δx, y+Δy) calculated in the above-described step S343 for each of the pixels. More specifically, the correction amount calculation unit 441 calculates the absolute difference value Diff (x+Δx, y+Δy) for each of the pixels by the above-described Formula (5). Alternatively, the correction amount calculation unit 441 may calculate a squared difference value as Diff (x+Δx, y+Δy) by the above-described Formula (6) instead of the absolute difference value Diff (x+Δx, y+Δy).

Subsequently, the correction amount calculation unit 441 calculates the sum value of the absolute difference values Diff as the similarity level Sim' (step S345). Specifically, the correction amount calculation unit 441 calculates the sum value of the absolute difference values of all the reference pixels as the similarity level Sim'. Note that the correction amount calculation unit 441 may calculate the weighted sum as the similarity level Sim'. In this case, the correction amount calculation unit 441 may change the weighting coefficient in accordance with a distance of each of the pixels from the pixel-of-interest (x, y). After step S345, the image processing apparatus 40 returns to the different-color component estimation value calculation processing based on a similarity level for the different-color component of the pixel-of-interest (x, y) in FIG. 18.

In this manner, in the similarity level Sim' calculation processing for each of candidate values EstC1' and EstC2', the correction amount calculation unit 441 calculates the similarity degree between the pixel value distribution and the theoretical value distribution by the sum of the absolute difference value or the sum of the squared difference values and defines this as the evaluation value. The estimation value, however, may be calculated by another method. For example, the correction amount calculation unit 441 may calculate the evaluation value using normalized cross-correlation (NCC), zero-mean normalized cross-correlation (ZNCC) or the like.

Returning to FIG. 18, step S328 and subsequent processing will be described.

In a case where Sim'<Sim is satisfied (step S328: Yes) in step S328, the correction amount calculation unit 441 updates the candidate value EstC1, the candidate value EstC2 and the similarity level Sim (EstC1=EstC1', EstC2=EstC2', Sim=Sim') (step S329). After step S329, the image processing apparatus 40 proceeds to step S330.

In step S328, in a case where Sim'<Sim is not satisfied (step S328: No), the image processing apparatus 40 proceeds to step S330.

Subsequently, the correction amount calculation unit 441 increments the candidate value EstC2' (step S330). In this case, the correction amount calculation unit 441 increments the value by one or more.

Thereafter, in a case where EstC2'≤EstC2Max is satisfied (step S331: Yes), the image processing apparatus 40 returns to the above-described step S327. In contrast, in a case where EstC2'≤EstC2Max is not satisfied (step S331: No), the image processing apparatus 40 proceeds to step S332.

In step S332, the correction amount calculation unit 441 increments the candidate value EstC1' (step S332). In this case, the correction amount calculation unit 441 increments the value by one or more.

Thereafter, in a case where EstC1'≤EstC1Max is satisfied (step S333: Yes), the image processing apparatus 40 returns to the above-described step S326. In contrast, in a case where EstC1'≤EstC1Max is not satisfied (step S333: No), the image processing apparatus 40 proceeds to step S334.

In step S334, the correction amount calculation unit 441 calculates the candidate value EstC1 and the candidate value EstC2 as different-color component estimation values. After step S334, the image processing apparatus 40 returns to the individual color component correction amount calculation processing in FIG. 17.

According to the third embodiment described above, since the correction amount calculation unit 441 collectively calculates the estimation values of different-color components, it is possible to calculate an estimation value with high accuracy even in the case of the image data obtained by capturing a subject of a color in which R component, G component, and B component are mixed.

Moreover, in the third embodiment, the correction amount calculation unit 441 may be configured to search the estimation value having the minimum similarity level by another method. For example, the correction amount calculation unit 441 may use a method of comprehensively arrange an estimation value to search for the minimum value, a known hill climbing method, a local search method, or the like.

Fourth Embodiment

Next, a fourth embodiment will be described. An imaging system according to the fourth embodiment has a same configuration as the imaging system 1 according to the above-described third embodiment, except that the image processing apparatus executes individual color component correction amount calculation processing in a different manner as in the third embodiment. Specifically, in the fourth embodiment, estimation values of all color components are collectively calculated. Hereinafter, individual color component correction amount calculation processing executed by the image processing apparatus according to the fourth embodiment will be described. A same reference sign will be given to the configuration identical to the configuration of the imaging system 1 according to the above-described third embodiment, and description for this will be omitted.

Outline of Individual Color Component Correction Amount Calculation Processing

Figure 20:
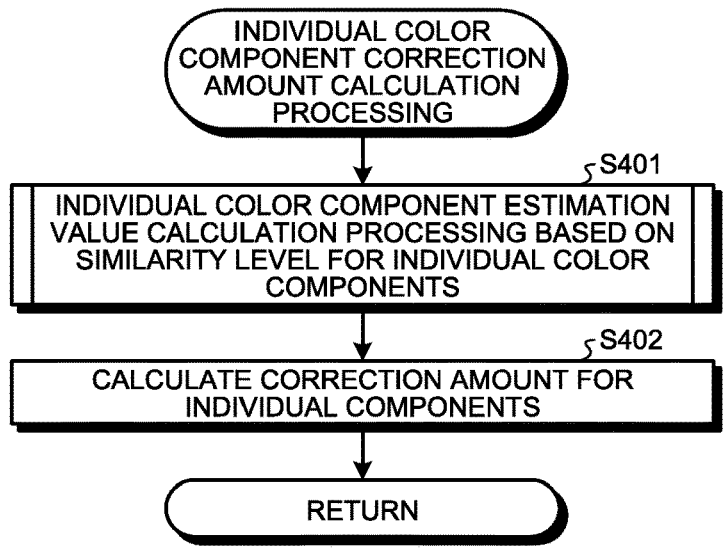
FIG. 20 is a flowchart illustrating an outline of individual color component correction amount calculation processing executed by an image processing apparatus according to a fourth embodiment.

FIG. 20 is a flowchart illustrating an outline of individual color component correction amount calculation processing executed by the image processing apparatus 40 according to the fourth embodiment.

As illustrated in FIG. 20, the correction amount calculation unit 441 first executes, for individual color components, individual color component estimation value calculation processing based on a similarity level, that is, processing of calculating estimation values of individual color components including a self color component and all the different-color components (step S401).

Figure 21:
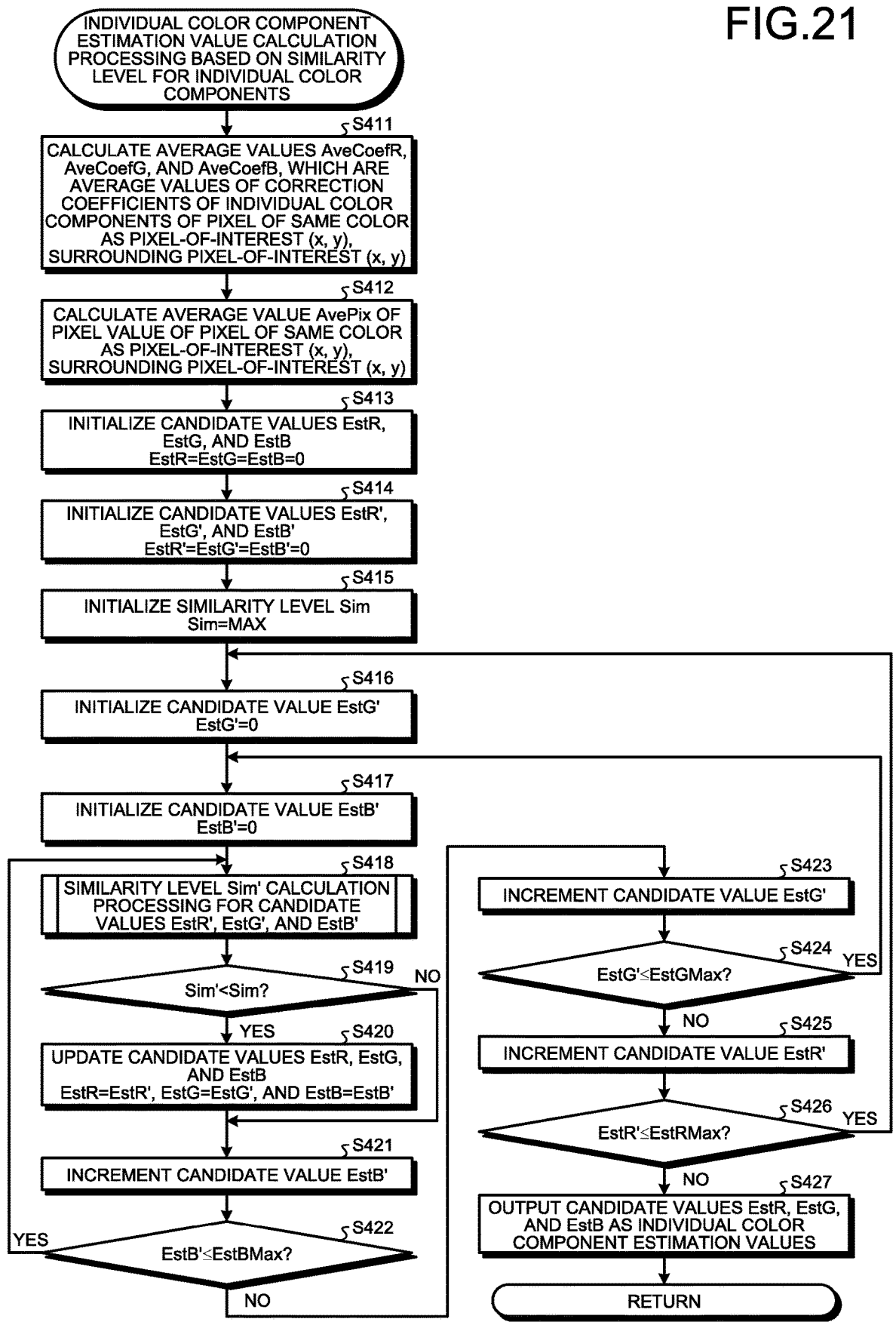
FIG. 21 is a flowchart illustrating an outline of individual color component estimation value calculation processing based on a similarity level for individual color components in FIG. 20.

Individual Color Component Estimation Value Calculation Processing Based on a Similarity Level for Individual Color Components FIG. 21 is a flowchart illustrating an outline of individual color component estimation value calculation processing based on a similarity level for individual color components.

As illustrated in FIG. 21, the correction amount calculation unit 441 calculates an average value AveCoefR, an average value AveCoefG, an average value AveCoefB, which are average values of correction coefficients of individual color components of the pixel of a same color as the pixel-of-interest (x, y), surrounding the pixel-of-interest (x, y) (step S411).

Subsequently, the correction amount calculation unit 441 calculates an average value AvePix of pixel values of pixels of a same color as the pixel-of-interest (x, y) surrounding the pixel-of-interest (x, y) (step S412). In this case, the correction amount calculation unit 441 desirably calculates the average value AvePix of the pixel values from the pixel value of the reference pixel.

Thereafter, the correction amount calculation unit 441 initializes the candidate value EstR, the candidate value EstG and the candidate value EstB (EstR=EstG=EstB=0) (step S413), and then, initializes the candidate value EstR', the candidate value EstG', and the candidate value EstB' (EstR'=EstG'=EstB'=0) (step S414).

Subsequently, the correction amount calculation unit 441 initializes the similarity level Sim (Sim=MAX) (step S415), initializes the candidate value EstG' (EstG'=0) (step S416), and initializes the candidate value EstB' (EstB'=0) (step S417).

Thereafter, the correction amount calculation unit 441 executes the similarity level Sim' calculation processing for the candidate values EstR', EstG', and EstB', that is, processing of calculating the similarity level Sim' for each of the candidate value EstR', the candidate value EstG' and the candidate value EstB' (Step S418).

Similarity Level Sim' Calculation Processing in Candidate Values EstR', EstG', and EstB'

Figure 22:
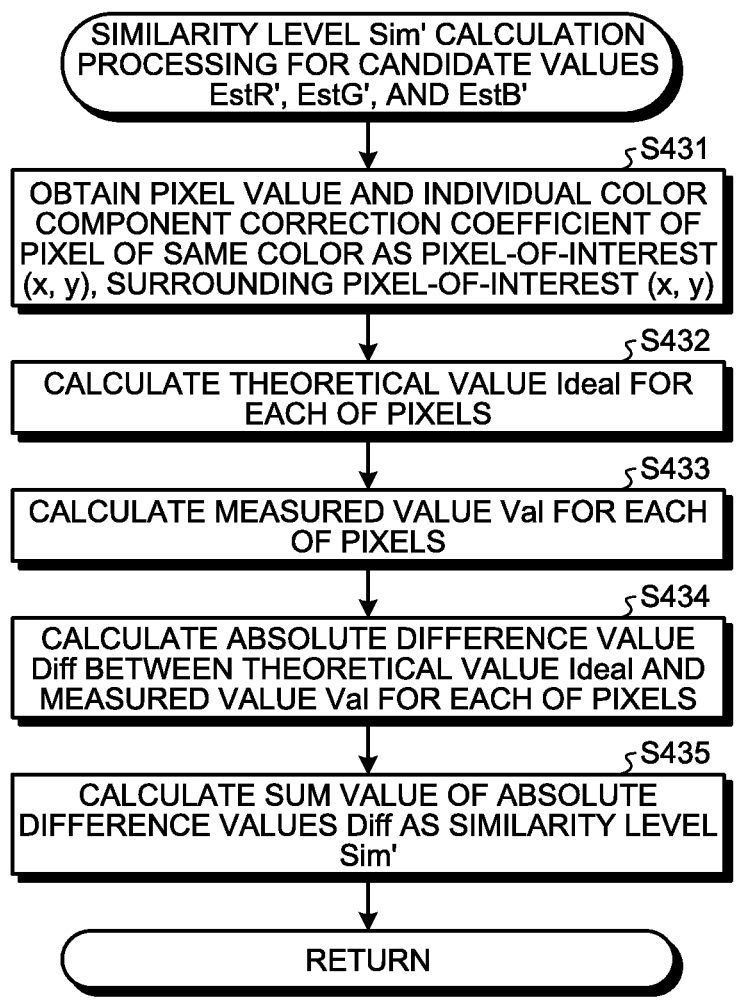
FIG. 22 is a flowchart illustrating an outline of the similarity level Sim' calculation processing in candidate values EstR', EstG', and EstB' in FIG. 21.

FIG. 22 is a flowchart illustrating an outline of the similarity level Sim' calculation processing in the candidate values EstR', EstG', and EstB' in step S418 of FIG. 21.

As illustrated in FIG. 22, the correction amount calculation unit 441 first obtains a pixel value of a pixel of a same color as the pixel-of-interest (x, y), surrounding the pixel-of-interest (x, y) and individual color component correction coefficients from the second buffer unit 422 (step S431). Specifically, the correction amount calculation unit 441 obtains pixel values and correction coefficients of the reference pixel from the second buffer unit 422.

Subsequently, the correction amount calculation unit 441 calculates the theoretical value Ideal for each of the pixels (step S432). Specifically, the correction amount calculation unit 441 calculates, on the reference pixel (x+Δx, y+Δy), the theoretical value Ideal by first calculating a difference between the individual color component correction coefficients CoefR (x+Δx, y+Δy), CoefG (x+Δx, y+Δy), and CoefB (x+Δx, y+Δy), and the average values AveCoefR, AveCoefG, and AveCoefB of the individual color component correction coefficients calculated in step S411 of FIG. 21 described above. The obtained difference is then respectively multiplied by the input individual color component candidate values EstR', EstG', and EstB', and the obtained values are added to each other to obtain the theoretical value Ideal (x+Δx, y+Δy). More specifically, the correction amount calculation unit 441 calculates the theoretical value Ideal(x+Δx, y+Δy) for each of the pixels by the following Formula (12).

$$\text{Ideal}(x + \Delta x, y + \Delta y) = \qquad (12)$$
$$(CoefR(x + \Delta x, y + \Delta y) - AveCoefR) \times EstR' +$$
$$(CoefG(x + \Delta x, y + \Delta y) - AveCoefG) \times EstG' +$$
$$(CoefB(x + \Delta x, y + \Delta y) - AveCoefB) \times EstB'$$

Thereafter, the correction amount calculation unit 441 calculates the measured value Val for each of the pixels (step S433). Specifically, on the reference pixel (x+Δx, y+Δy), the correction amount calculation unit 441 calculates a difference between a pixel value Pix (x+Δx, y+Δy) and the average value AvePix of the pixel value calculated in step S412 of FIG. 21, as the measurement Val (x+Δx, y+Δy). More specifically, the correction amount calculation unit 441 calculates the measured value Val (x+Δx, y+Δy) for each of the pixels by the following Formula (13).

$$\text{Val}(x+\Delta x, y+\Delta y) = \text{Pix}(x+\Delta x, y+\Delta y) - \text{AvePix} \qquad (13)$$

Subsequently, the correction amount calculation unit 441 calculates an absolute difference value Diff between the theoretical value Ideal and the measured value Val for each of the pixels (step S434). Specifically, the correction amount calculation unit 441 calculates the absolute difference value Diff(x+Δx, y+Δy) between the theoretical value Ideal(x+Δx, y+Δy) and the measured value Val(x+Δx, y+Δy) in the pixel (x+Δx, y+Δy) for each of the reference pixels. More specifically, the correction amount calculation unit 441 calculates the absolute difference value Diff (x+Δx, y+Δy) for each of the pixels by the following Formula (14).

$$\text{Diff}(x+\Delta x, y+\Delta y) = |\text{Val}(x+\Delta x, y+\Delta y) - \text{Ideal}(x+\Delta x, y+\Delta y)| \qquad (14)$$

Note that the correction amount calculation unit 441 may set the squared difference value like Formula (15) as Diff (x+Δx, y+Δy) instead of the absolute difference value Diff (x+Δx, y+Δy).

$$\text{Diff}(x+\Delta x, y+\Delta y) = (\text{Val}(x+\Delta x, y+\Delta y) - \text{Ideal}(x+\Delta x, y+\Delta y))^2 \qquad (15)$$

Thereafter, the correction amount calculation unit 441 calculates the sum value of the absolute difference values Diff as the similarity level Sim' (step S435). Specifically, the correction amount calculation unit 441 calculates the sum value of the absolute difference values of all the reference pixels as the similarity level Sim'. Note that the correction amount calculation unit 441 may calculate the weighted sum as the similarity level Sim'. In this case, the correction amount calculation unit 441 may change the weighting coefficient in accordance with a distance of each of the pixels from the pixel-of-interest (x, y). After step S435, the image processing apparatus 40 returns to the processing of individual color component estimation value calculation processing based on a similarity level for individual color components of FIG. 21.

In this manner, in the similarity level Sim' calculation processing for each of candidate values EstR', EstG', and EstB', the correction amount calculation unit 441 calculates the similarity degree between the pixel value distribution and the theoretical value distribution by the sum of the absolute difference value or the sum of the squared difference values and defines this as the evaluation value. The evaluation value, however, may be calculated by another method. For example, the correction amount calculation unit 441 may calculate the evaluation value using normalized cross-correlation (NCC), zero-mean normalized cross-correlation (ZNCC) or the like.

Returning to FIG. 21, step S419 and subsequent processing will be described.

In a case where Sim'<Sim is satisfied (step S419: Yes) in step S419, the correction amount calculation unit 441 updates the candidate values EstR, EstG, EstB (EstR=EstR', EstG=EstG', and EstB=EstB') (Step S420). After step S420, the image processing apparatus 40 proceeds to step S421.

In step S419, in a case where Sim'<Sim is not satisfied (step S419: No), the image processing apparatus 40 proceeds to step S421.

Subsequently, the correction amount calculation unit 441 increments the candidate value EstB' (step S421). In this case, the correction amount calculation unit 441 increments the value by one or more.

Thereafter, in a case where the candidate value EstB'≤EstBMax is satisfied (EstBMax is a preset maximum value within a candidate value search range of B) (step S422: Yes), the image processing apparatus 40 returns to the above-described step S418. In contrast, in a case where the candidate value EstB'≤EstBMax is not satisfied (step S422: No), the image processing apparatus 40 proceeds to step S423.

In step S423, the correction amount calculation unit 441 increments the candidate value EstG'. In this case, the correction amount calculation unit 441 increments the value by one or more.

Subsequently, in a case where the candidate value EstG'≤EstGMax is satisfied (EstGMax is a preset maximum value of a candidate value search range of G) (step S424: Yes), the image processing apparatus 40 returns to the above-described step S417. In contrast, in a case where the candidate value EstB'≤EstGMax is not satisfied (step S424: No), the image processing apparatus 40 proceeds to step S425.

In step S425, the correction amount calculation unit 441 increments the candidate value EstR'. In this case, the correction amount calculation unit 441 increments the value by one or more.

Subsequently, in a case where the candidate value EstR'≤EstRMax is satisfied (EstRMax is the maximum value of a preset candidate value search range of R) (step S426: Yes), the image processing apparatus 40 returns to the above-described step S416. In contrast, in a case where the candidate value EstR'≤EstRMax is not satisfied (step S426: No), the image processing apparatus 40 proceeds to step S427.

In step S427, the correction amount calculation unit 441 calculates the candidate values EstR, EstG, and EstB as the individual color component estimation values. After step S427, the processing returns to the individual color component correction amount calculation processing in FIG. 20.

Returning to FIG. 20, step S402 and subsequent processing will be described.

In step S402, the correction amount calculation unit 441 multiplies the estimation value of individual color components of the pixel-of-interest (x, y) calculated in step S401 described above by the correction coefficient to calculate the correction amount of individual color components for the pixel value of the pixel-of-interest (x, y). After step S402, the image processing apparatus 40 returns to the individual color component correction amount calculation processing of FIG. 17.

According to the fourth embodiment described above, since the correction amount calculation unit 441 collectively calculates the estimation values of all color components, it is possible to calculate an estimation value even in the case of the image data obtained by capturing a subject of a color in which R component, G component, and B component are mixed.

Moreover, in the fourth embodiment, the correction amount calculation unit 441 may be configured to search the estimation value having the minimum similarity level by another method. For example, the correction amount calculation unit 441 may use a method of comprehensively arrange an estimation value to search for the minimum value, a known hill climbing method, a local search method, or the like.

Fifth Embodiment

Next, a fifth embodiment will be described. An imaging system according to the fifth embodiment has a same configuration as the imaging system 1 according to the above-described third embodiment, and the image processing apparatus execute individual color component correction amount calculation processing in a different manner as in the third embodiment. Specifically, the fifth embodiment calculates the estimation value by solving simultaneous equations including a relational expression between a pixel value in a surrounding pixel, a correction coefficient of the reference pixel, and an estimation value, established for each of the pixels. Hereinafter, individual color component correction amount calculation processing executed by the image processing apparatus according to the fifth embodiment will be described. A same reference sign will be given to the configuration identical to the configuration of the imaging system 1 according to the above-described third embodiment, and description for this will be omitted.

Outline of Individual Color Component Correction Amount Calculation Processing

Figure 23:
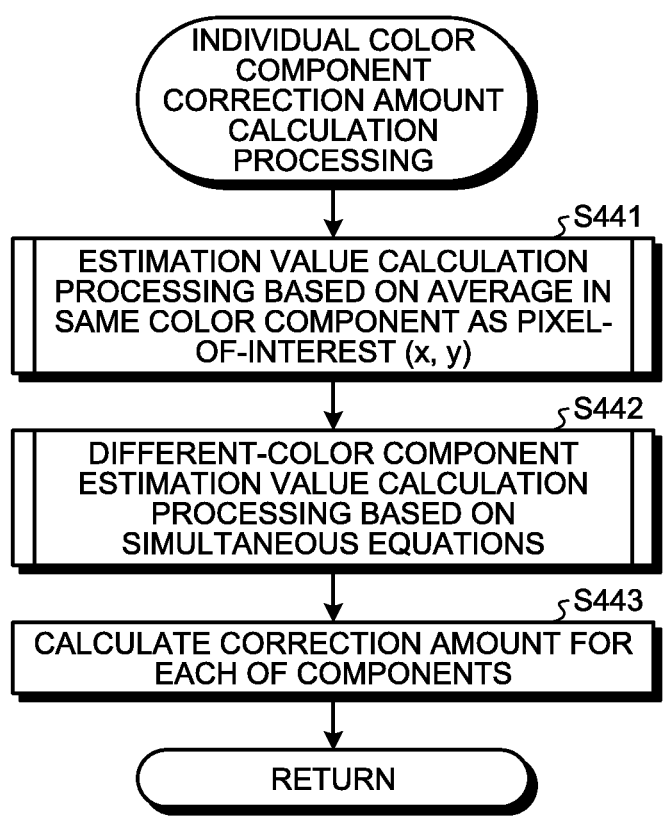
FIG. 23 is a flowchart illustrating an outline of individual color component correction amount calculation processing executed by an image processing apparatus according to a fifth embodiment.

FIG. 23 is a flowchart illustrating an outline of individual color component correction amount calculation processing executed by the image processing apparatus 40 according to the fifth embodiment.

As illustrated in FIG. 23, the correction amount calculation unit 441 first executes estimation value calculation processing based on average for a same color component as the pixel-of-interest (x, y) (step S441).

Subsequently, the correction amount calculation unit 441 executes different-color component estimation value calculation processing based on simultaneous equations, that is, processing of calculating an estimation value of a different-color component by simultaneous equations (step S442)

Figure 24:
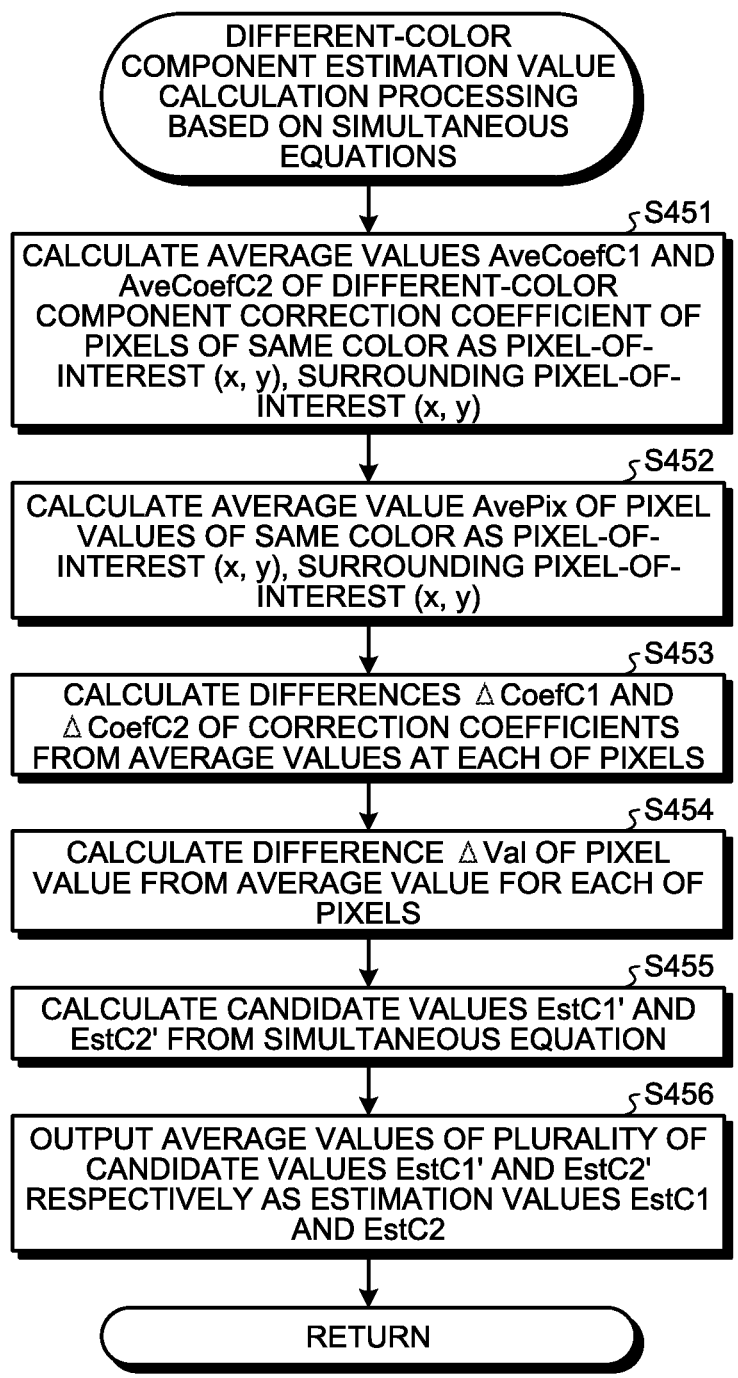
FIG. 24 is a flowchart illustrating an outline of different-color component estimation value calculation processing based on simultaneous equations in FIG. 23.

Different-Color Component Estimation Value Calculation Processing Based on Simultaneous Equations FIG. 24 is a flowchart illustrating an outline of different-color component estimation value calculation processing based on simultaneous equations in step S422 of FIG. 23.

As illustrated in FIG. 24, the correction amount calculation unit 441 first calculates the average value AveCoefC1 and the average value AveCoefC2 of the different-color component correction coefficients of the pixel of a same color as the pixel-of-interest (x, y), surrounding the pixel-of-interest (x, y) (Step S451).

Subsequently, the correction amount calculation unit 441 calculates an average value AvePix of pixel values of the pixels of a same color as the pixel-of-interest (x, y) surrounding the pixel-of-interest (x, y) (step S452). In this case, the correction amount calculation unit 441 desirably calculates the average value AvePix of the pixel values from the pixel value of the reference pixel. At this time, the correction amount calculation unit 441 may calculate a statistical value in addition to the average value. For example, the correction amount calculation unit 441 may calculate a weighted average value, a median value, or the like.

Thereafter, the correction amount calculation unit 441 calculates differences $\Delta$CoefC1 and $\Delta$CoefC2 from the average values of the correction coefficients for each of the pixels (step S453). Specifically, the correction amount calculation unit 441 calculates, on the reference pixel (x+$\Delta$x, y+$\Delta$y), the differences $\Delta$CoefC1 (x+$\Delta$x, y+$\Delta$y) and $\Delta$CoefC2 (x+$\Delta$x, y+$\Delta$y) between the correction coefficient CoefC1 (x+$\Delta$x, y+$\Delta$y) of the C1 component and the correction coefficient CoefC2 (x+$\Delta$x, y+$\Delta$y) of the C2 component, and the average values AveCoefC1 and AveCoefC2 of the correction coefficients of the C1 and C2 components, calculated in step S451, for each of the pixels. Specifically, the correction amount calculation unit 441 calculates the difference $\Delta$CoefC1 (x+$\Delta$x, y+$\Delta$y) and $\Delta$CoefC2 (x+$\Delta$x, y+$\Delta$y) of the correction coefficient for each of the pixels from the average value by the following Formulas (16) and (17) for each of the pixels.

$$\Delta CoefC1(x+\Delta x,y+\Delta y)=CoefC1(x+\Delta x,y+\Delta y)-AveCoefC1 \quad (16)$$

$$\Delta CoefC2(x+\Delta x,y+\Delta y)=CoefC2(x+\Delta x,y+\Delta y)-AveCoefC2 \quad (17)$$

Subsequently, the correction amount calculation unit 441 calculates a difference $\Delta$Val of the pixel value from the average value for each of the pixels (step S454). Specifically, on the reference pixel (x+$\Delta$x, y+$\Delta$y), the correction amount calculation unit 441 calculates a difference $\Delta$Val (x+$\Delta$x, y+$\Delta$y) of the pixel values Pix (x+$\Delta$x, y+$\Delta$y) from the average value AvePix of the pixel values calculated in the above-described step S452, for each of the pixels. More specifically, the correction amount calculation unit 441 calculates the difference $\Delta$Val (x+$\Delta$x, y+$\Delta$y) by the following Formula (18).

$$\Delta Val(x+\Delta x,y+\Delta y)=Pix(x+\Delta x,y+\Delta y)-AvePix \quad (18)$$

Thereafter, the correction amount calculation unit 441 calculates candidate values EstC1' and EstC2' from the simultaneous equations (step S455). Specifically, the correction amount calculation unit 441 extracts two pixels (x+$\Delta$x1, y+$\Delta$y1) and pixels (x+$\Delta$x2, y+$\Delta$y2) from the reference pixels so as to calculate candidate values EstC1' and EstC2' in the extracted pixels by solving the simultaneous equations (19) and (20) as follows.

$$\Delta Val(x+\Delta x1,y+\Delta y1)=\Delta CoefC1(x+\Delta x1,y+\Delta y1)\times EstC1'+\Delta CoefC2(x+\Delta x1,y+\Delta y1)\times EstC2' \quad (19)$$

$$\Delta Va2(x+\Delta x2,y+\Delta y2)=\Delta CoefC1(x+\Delta x2,y+\Delta y2)\times EstC1'+\Delta CoefC2(x+\Delta x2,y+\Delta y2)\times EstC2' \quad (20)$$

The correction amount calculation unit 441 executes the above-described calculation on the two pixels extracted by the following method to calculate the candidate values EstC1' and EstC2' for each of the pixels. Specifically, the correction amount calculation unit 441 executes calculation in all combinations of extracting two pixels from the reference pixel.

Moreover, the correction amount calculation unit 441 may perform calculation in all combinations of extracting two pixels from representative reference pixels. For example, the correction amount calculation unit 441 defines k pixels counting from the pixel having the largest absolute value of the correction coefficient as the representatives. In this case, in comparison of a case where the correction amount calculation unit 441 selects k pixels having small absolute value of the correction coefficient with a case where the unit selects k pixels having large absolute value of the correction coefficient, the proportion of the k errors is small in the case of large absolute value of the correction coefficient, leading to higher accuracy of the estimation value obtained.

Furthermore, the correction amount calculation unit 441 may execute the calculation for all cases in which two pixels are extracted from the pixels having similar correction coefficient values.

In step S456, the correction amount calculation unit 441 uses the plurality of candidate values EstC1' and EstC2' calculated in step S455 to obtain their average values to calculate as the estimation values EstC1 and EstC2. Note that the correction amount calculation unit 441 may calculate the values calculated from other statistical values such as a weighted average value and a median value other than the average value, as the estimation values EstC1 and EstC2. Moreover, the correction amount calculation unit 441 may calculate the value obtained by calculating the average value of the candidate value by extraction of two pixels having the similar number of correction coefficients, as the estimation value Est. This calculation makes it possible to reduce the influence of variation in pixel value due to random noise.

Returning to FIG. 23, step S443 and subsequent processing will be described.

In step S443, the correction amount calculation unit 441 multiplies the estimation value of individual color components of the pixel-of-interest (x, y) calculated in step S442 described above by the correction coefficient to calculate the correction amount of individual color components for the pixel value of the pixel-of-interest (x, y). After step S443, the image processing apparatus 40 returns to the individual color component correction amount calculation processing in FIG. 17.

According to the fifth embodiment described above, the correction amount calculation unit 441 may calculate the estimation value by solving simultaneous equations including a relational expression between the pixel value in the surrounding pixel of a same color, the correction coefficient of a surrounding pixel of a same color, and the estimation value, established for each of the pixels.

While the fifth embodiment is a case of calculating the estimation value by solving simultaneous equations of two components, it is allowable to calculate the estimation value by solving simultaneous equations of three components of R component, G component, and B component.

Sixth Embodiment

Next, a sixth embodiment will be described. An imaging system according to the sixth embodiment has a same configuration as the imaging system 1 according to the above-described third embodiment, except that the image processing apparatus executes individual color component correction amount calculation processing in a different manner as in the third embodiment. Hereinafter, individual color component correction amount calculation processing executed by the image processing apparatus according to the sixth embodiment will be described.

Individual Color Component Correction Amount Calculation Processing

Figure 25:
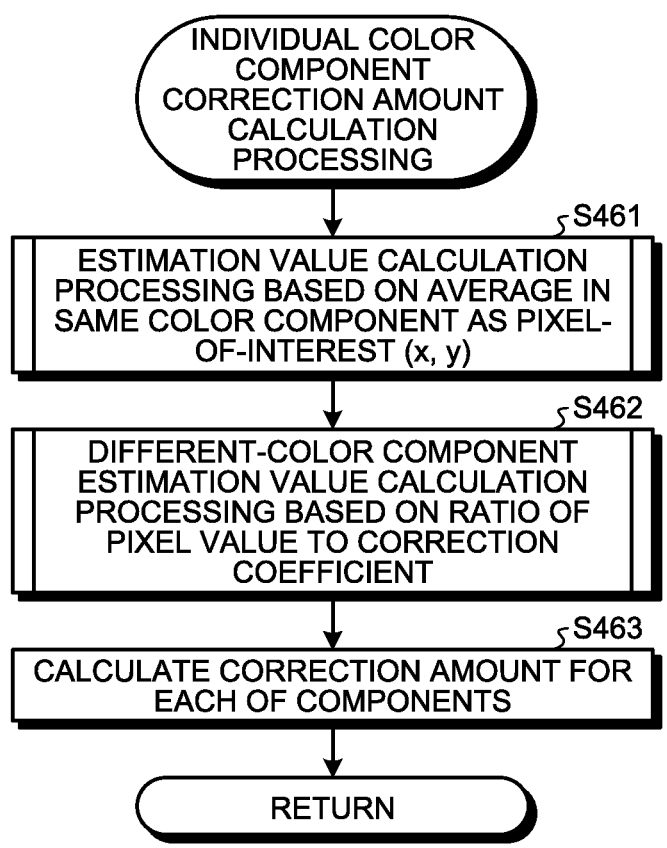
FIG. 25 is a flowchart illustrating an outline of individual color component correction amount calculation processing executed by an image processing apparatus according to a sixth embodiment.

FIG. 25 is a flowchart illustrating outline of individual color component correction amount calculation processing executed by the image processing apparatus 40 according to the sixth embodiment. Steps S461 and S463 in FIG. 25 correspond to steps S441 and S443 in above-described FIG. 23, respectively.

In step S462, the correction amount calculation unit 441 executes different-color component estimation value calculation processing based on the ratio of the pixel value to the correction coefficient.

Figure 26:
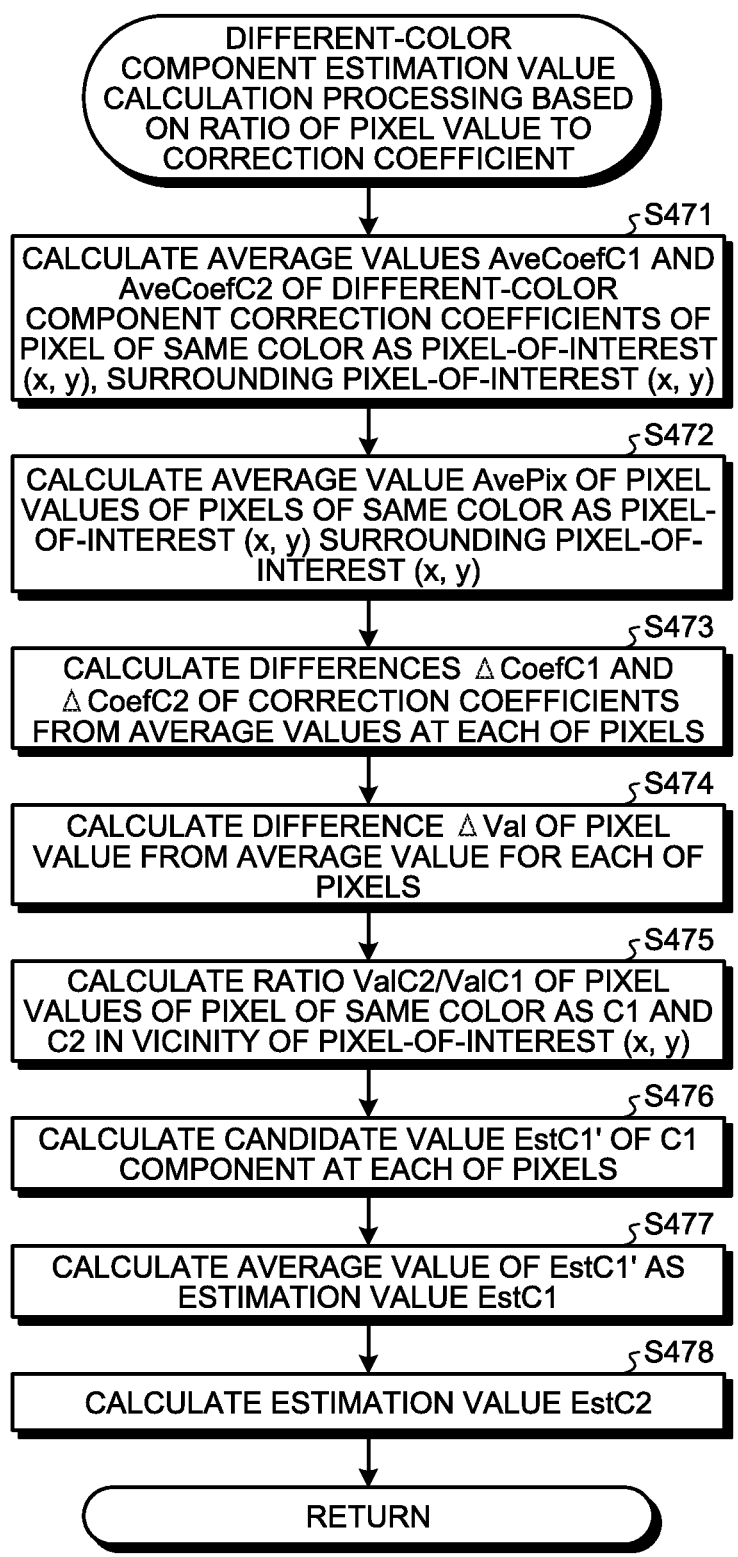
FIG. 26 is a flowchart illustrating an outline of different-color components estimation value calculation processing based on a ratio of a pixel value to the correction coefficient in FIG. 25.

Different-Color Component Estimation Value Calculation Processing Based on Ratio of Pixel Value to Correction Coefficient FIG. 26 is a flowchart illustrating an outline of the different-color component estimation value calculation processing based on the ratio of the pixel value to the correction coefficient described in step S462 of FIG. 25.

As illustrated in FIG. 26, the correction amount calculation unit 441 first calculates the average value AveCoefC1 and the average value AveCoefC2 of the different-color component correction coefficients of the pixel of a same color as the pixel-of-interest (x, y), surrounding the pixel-of-interest (x, y) (step S471).

Subsequently, the correction amount calculation unit 441 calculates an average value AvePix of pixel values of the pixels of a same color as the pixel-of-interest (x, y) surrounding the pixel-of-interest (x, y) (step S472). In this case, the correction amount calculation unit 441 desirably calculates the average value AvePix of the pixel values from the pixel value of the reference pixel. At this time, the correction amount calculation unit 441 may calculate a statistical value in addition to the average value. For example, the correction amount calculation unit 441 may calculate a weighted average value, a median value, or the like.

Thereafter, the correction amount calculation unit 441 calculates differences $\Delta$CoefC1 and $\Delta$CoefC2 from the average values of the correction coefficients in each of the pixels (step S473). Specifically, the correction amount calculation unit 441 calculates, on the reference pixel (x+$\Delta$x, y+$\Delta$y), the differences $\Delta$CoefC1 and $\Delta$CoefC2 between the correction coefficient CoefC1 (x+$\Delta$x, y+$\Delta$y) of the C1 component and the correction coefficient CoefC2 (x+$\Delta$x, y+$\Delta$y) of the C2 component, and the average values AveCoefC1 and AveCoefC2 of the different-color component correction coefficients calculated in step S471, for each of the pixels. More specifically, the correction amount calculation unit 441 calculates $\Delta$CoefC1 and $\Delta$CoefC2 for each of the pixels by the following Formulas (21) and (22).

$$\Delta CoefC1(x+\Delta x, y+\Delta y) = CoefC1(x+\Delta x, y+\Delta y) - AveCoefC1 \qquad (21)$$

$$\Delta CoefC2(x+\Delta x, y+\Delta y) = CoefC2(x+\Delta x, y+\Delta y) - AveCoefC2 \qquad (22)$$

Subsequently, the correction amount calculation unit 441 calculates a difference $\Delta$Val of the pixel value from the average value for each of the pixels (step S474). Specifically, on the reference pixel (x+$\Delta$x, y+$\Delta$y), the correction amount calculation unit 441 calculates a difference $\Delta$Val (x+$\Delta$x, y+$\Delta$y) of the pixel values Pix (x+$\Delta$x, y+$\Delta$y) from the average value AvePix of the pixel values calculated in the above-described step S472, for each of the pixels. More specifically, the correction amount calculation unit 441 calculates $\Delta$Val (x+$\Delta$x, y+$\Delta$y) by the following Formula (23).

$$\Delta Val(x+\Delta x, y+\Delta y) = Pix(x+\Delta x, y+\Delta y) - AvePix \qquad (23)$$

Thereafter, the correction amount calculation unit 441 calculates a ratio ValC2/ValC1 of the pixel values of the pixel of a same color as C1 and C2 in the vicinity of the pixel-of-interest (x, y) (step S475). Specifically, the correction amount calculation unit 441 defines the pixel values of the pixel having same colors as the C1 component and the C2 component in the vicinity of the pixel-of-interest (x, y) as ValC1 and ValC2, and calculates the ratio ValC2/ValC1. The correction amount calculation unit 441 may define the pixel value average values of the pixel of same colors as C1 and C2 within a M×N pixel range as ValC1 and ValC2, with respect to the pixel-of-interest (x, y) as a center. Moreover, in a case where pixels in the vicinity are saturated, the correction amount calculation unit 441 may calculate the pixel values ValC1 and ValC2 in a region of the pixel closest to the pixel-of-interest in which the ratio of the pixel values of C1 and C2 may be calculated.

Figure 27:
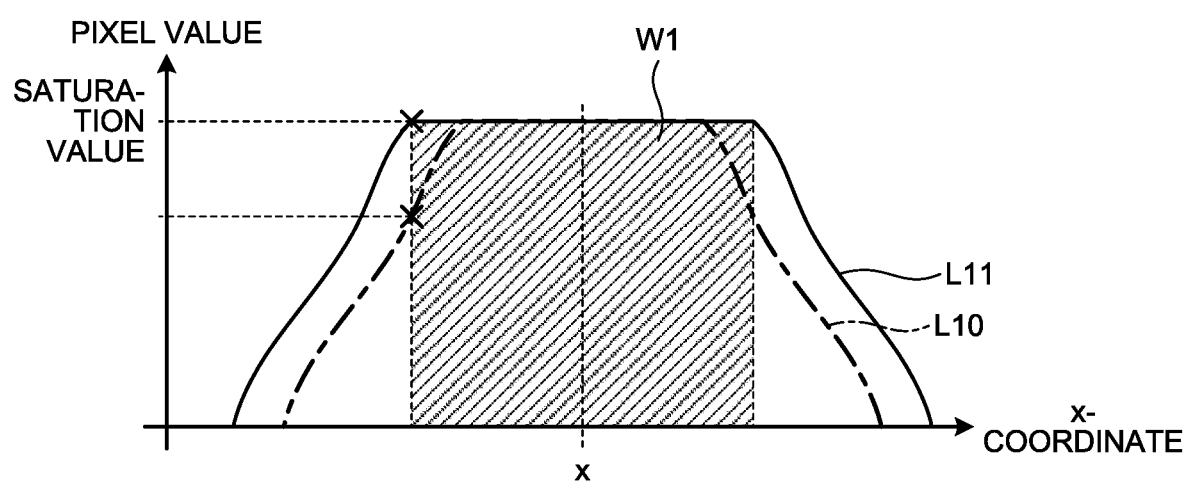
FIG. 27 is a diagram schematically illustrating a calculation region of the ratio Ratio in a case where a different-color pixel in the vicinity of the pixel-of-interest (x, y) is saturated.

FIG. 27 is a diagram schematically illustrating a calculation region of the ratio (Ratio) in a case where a pixel of a different color in the vicinity of the pixel-of-interest (x, y) is saturated. In FIG. 27, the horizontal axis represents the x-coordinate, and the vertical axis represents the pixel value. Moreover, in FIG. 27, a curve L10 indicates a pixel value of the R pixel and a curve L11 indicates a pixel value of the B pixel. Moreover, in FIG. 27, a hatched region W1 indicates a saturated region.

As illustrated in FIG. 27, both the pixel C1 and the pixel C2 are saturated in the hatched region W1 making it difficult to calculate the ratio ValC2/ValC1 correctly. Therefore, the correction amount calculation unit 441 calculates the pixel values ValC1 and ValC2 in the region of the pixel closest to the pixel-of-interest in which the ratio of the pixel values of C1 and C2 may be calculated.

Returning to FIG. 26, step S476 and subsequent processing will be described.

In step S476, the correction amount calculation unit 441 calculates the candidate value EstC1' for the C1 component for each of the pixels. Specifically, the correction amount calculation unit 441 calculates the candidate value EstC1' for each of the pixels by the following Formula (24).

$$EstC1'(x+\Delta x, y+\Delta y) = \frac{\Delta Val(x+\Delta x, y+\Delta y)}{\Delta CoefC1(x+\Delta x, y+\Delta y) + \Delta CoefC2(x+\Delta x, y+\Delta y) \cdot \frac{ValC2}{ValC1}} \qquad (24)$$

In a case where the denominator of the above equation is 0, the correction amount calculation unit 441 sets such that EstC1' (x+$\Delta$x, y+$\Delta$y)=0, or excludes processing of the pixel (x+$\Delta$x, y+$\Delta$y). When pixel processing is excluded, the correction amount calculation unit 441 excludes the same pixel in the next average value calculation processing as well, similarly to the current processing.

Thereafter, the correction amount calculation unit 441 calculates an average value of the candidate value EstC1' as the estimation value EstC1 (step S477). Specifically, the correction amount calculation unit 441 calculates the average value of the candidate values EstC1' of all the pixels calculated in the above-described step S476, as the estimation value EstC1. In this case, the correction amount calculation unit 441 may calculate the values calculated from other statistical values such as a weighted average value and a median value other than the average value, as the estimation value EstC1. It is assumed that the correction amount calculation unit 441 initializes EstC1 to 0 before executing the processing of step S477.

Subsequently, the correction amount calculation unit 441 calculates the estimation value EstC2 (step S478). Specifically, the correction amount calculation unit 441 calculates the estimation value EstC2 using the estimation value EstC1 calculated in the above-described step S477 and the ratio ValC2/ValC1 calculated in step S475. More specifically, the correction amount calculation unit 441 calculates the estimation value EstC2 by the following Formula (25).

$$EstC2 = EstC1 \times (ValC2/ValC1) \qquad (25)$$

After step S478, the image processing apparatus 40 returns to the individual color component correction amount calculation processing of FIG. 25.

According to the sixth embodiment described above, it is possible to calculate the estimation value based on the ratio of the pixel value of each of the pixels in the surrounding pixels in which pixel values are not saturated and the correction coefficient of each of the pixels in the surrounding pixels of a same color.

While the sixth embodiment calculates the estimation value based on the ratio of the pixel value of each of the pixels in the surrounding pixels in which pixel values are not saturated and the correction coefficient of each of the pixels in the surrounding pixels of a same color, it is also allowable to use this method to search for the minimum value of the similarity level in the above described first, third embodiment, or the like.

Other Embodiments

While the color filter according to the embodiment is a Bayer array color filter including an R filter, a G filter, and a B filter, the present disclosure may also be applied to other color filters. For example, the present disclosure is applicable to a color filter including the G filter, the B filter, and a complementary color Mg (magenta) filter to substitute the R filter in the color filter according to the above-described embodiment. Moreover, the present disclosure may be applicable to a color filter of a complementary color filter using a Cy (cyan) filter, a Mg filter and a Ye (yellow) filter. In the use of such a color filter, it would be sufficient to perform processing by a known interpolation method of perform interpolation from a complementary color to a primary color.

Moreover, while the embodiment provide a plurality of color filters having different spectral transmittances on one image sensor, it is also possible to apply the present disclosure to a two-chip imaging apparatus using an image sensor exclusively including the G filter only transmitting the green wavelength region provided on a light receiving surface of each of the pixels or all over the image sensor and using an image sensor including the R filters and the B filters respectively transmitting red or blue wavelength regions, being arranged alternately on the light receiving surface of each of the pixels so as to form a checkered pattern, or apply the present disclosure to a three-chip imaging apparatus using image sensors each of which includes the R filter alone, the G filter alone, and the B filter alone. In this case, in a case where the correction coefficient of the G pixel in one image sensor is calculated, the correction amount according to the present disclosure may be calculated using the pixel value of the R pixel or the B pixel of the other image sensor corresponding to the coordinates of the G pixel.

According to the present disclosure, it is possible to correct variations in spectral sensitivity of each of a plurality of pixels constituting the image sensor.

The present disclosure is not limited to the above-described embodiments, but various modifications and further applications are of course available within the scope. For example, it is allowable to install, as an image processing engine, the image processing apparatus according to the present disclosure to any apparatus capable of shooting a subject such as a mobile apparatus having an image sensor of a mobile phone or a smartphone or an imaging apparatus that images the subject using an optical device such as a video camera, an endoscope, a surveillance camera, or a microscope, besides the imaging system used in the description.

Moreover, in the description of the flowcharts for the operations described above in the present specification, terms such as "first", "next", "subsequently", and "thereafter" are used to describe operation for convenience. These do not denote, however, that the operations need to be performed in this order.

Moreover, the methods of the processing performed by the image processing apparatus in the above-described embodiments, that is, any of the processing illustrated in the flowcharts may be stored as a program that may be executed by a control unit such as a CPU. In addition, it is possible to distribute by storing in a storage medium of the external storage device, such as memory cards (ROM card, RAM card, etc.), a magnetic disk (flexible disk, hard disk, etc.), an optical disc (CD-ROM, DVD, etc.), and a semiconductor memory. The control unit such as a CPU reads the program stored in the storage medium of the external storage device and controls the operation by the read program to execute the above-described processing.

Moreover, note that the present disclosure is not limited to the above-described embodiments and modifications just as they are but may be embodied by modifying the components without departing from the scope of the disclosure at a stage of implementation of the disclosure. Furthermore, a plurality of components disclosed in the above-described embodiments may be appropriately combined to form various disclosures. For example, some components may be omitted from the all the components described in the embodiments and the modification example. Furthermore, the components described in each of exemplary embodiments and modification examples may be appropriately combined with each other.

Moreover, a term which has been described at least once in the specification or the drawings, associated with another term having a broader or similar meaning, may be substituted by this other term anywhere in the specification and the drawings. In this manner, various modifications and further application may be implemented within a scope that does not depart from the present disclosure.

What is claimed is:

1. An image processing apparatus comprising:
a processor comprising hardware, wherein the processor is configured to:
obtain image data generated by an image sensor that forms a predetermined array pattern using color filters of a plurality of colors having mutually different spectral transmittances and in which each of the color filters is arranged at a position corresponding to any of a plurality of pixels;
obtain a correction coefficient for each of the plurality of pixels, the correction coefficient for correcting a difference between pixel values corresponding to a difference between a spectral sensitivity and a preset reference spectral sensitivity in a predetermined wavelength range in a pixel-of-interest;
calculate an estimation value of a color component as a correction target in the pixel-of-interest using a pixel value of each of pixels in surrounding pixels of a same color and the correction coefficient, the surrounding pixel of a same color being a pixel surrounding the pixel-of-interest and being a color filter arranged on the each of the surrounding pixels and a pixel including a color filter having a same color as a color filter arranged on the pixel-of-interest;
calculate a correction amount of the pixel value of the pixel-of-interest based on the estimation value and the correction coefficient of the pixel-of-interest; and
correct the pixel value of the pixel-of-interest based on the correction amount calculated.

2. The image processing apparatus according to claim 1, wherein the processor is configured to:
calculate a similarity level from a theoretical value of the pixel value in the surrounding pixel of a same color calculated based on a candidate value and the correction coefficient of each of the pixels in the surrounding pixel of a same color and from a measured value of the pixel value in the surrounding pixel of a same color; and
calculate the candidate value having a high similarity level as the estimation value.

3. The image processing apparatus according to claim 2, wherein the theoretical value is a product of the candidate value and the correction coefficient of each of the pixels in the surrounding pixels of a same color.

4. The image processing apparatus according to claim 2, wherein the similarity level is a value based on a difference between the theoretical value and the measured value of each of the pixels in the surrounding pixels of a same color.

5. The image processing apparatus according to claim 1, wherein the processor is configured to:
divide a pixel value of each of the pixels in the surrounding pixels of a same color by the correction coefficient; and
calculate the estimation value based on the value obtained by the division.

6. The image processing apparatus according to claim 5, wherein the processor is configured to calculate a statistical value obtained by dividing the pixel value of each of the pixels in the surrounding pixels of a same color by the correction coefficient as the estimation value.

7. The image processing apparatus according to claim 1, wherein the processor is configured to calculate, for the surrounding pixel of a same color, the estimation value by solving simultaneous equations including a relational expression between the pixel value in the surrounding pixel of a same color, the correction coefficient, and the estimation value, established for each of the pixels.

8. The image processing apparatus according to claim 7, wherein the processor is configured to calculate, as the estimation value, a statistical value of the estimation value calculated by combining each of a plurality of pixels of the surrounding pixels of a same color.

9. The image processing apparatus according to claim 1, wherein the processor is configured to calculate, in surrounding portions of the pixel-of-interest, the estimation value based on a ratio of a pixel value of each of the pixels in the surrounding pixels in which pixel values are not saturated to the correction coefficient of each of the pixels in the surrounding pixels of a same color.

10. The image processing apparatus according to claim 1, wherein the processor is configured to correct the pixel value of the pixel-of-interest using the correction amount such that the corrected pixel value of the pixel-of-interest falls from an average value of the pixel value of each of the pixels in the surrounding pixels of a same color to the pixel value of the pixel-of-interest.

11. The image processing apparatus according to claim 1, wherein the processor is configured to not subtract the correction amount from the pixel value of the pixel-of-interest in a case where a difference between the value obtained by subtracting the correction amount from the pixel value of the pixel-of-interest and the average value of the pixel value of the surrounding pixels of a same color is larger than a predetermined value.

12. An image processing method comprising:
obtaining image data generated by an image sensor that forms a predetermined array pattern using color filters of a plurality of colors having mutually different spectral transmittances and in which each of the color filters is arranged at a position corresponding to any of a plurality of pixels and obtaining a correction coefficient from a recording unit configured to record, for each of the pixels, the correction coefficient for correcting a difference between pixel values corresponding to a difference between a spectral sensitivity and a preset reference spectral sensitivity in a predetermined wavelength range in a pixel-of-interest;
calculating an estimation value of a color component as a correction target in the pixel-of-interest using a pixel value of each of pixels in a surrounding pixel of a same color and the correction coefficient, the surrounding pixel of a same color being a pixel surrounding the pixel-of-interest and being a pixel including a color filter having a same color as a color filter arranged on the pixel-of-interest;
calculating a correction amount of the pixel value of the pixel-of-interest based on the estimation value and the correction coefficient of the calculated pixel-of-interest; and
correcting the pixel value of the pixel-of-interest based on the calculated correction amount.

13. A non-transitory computer-readable recording medium on which an executable program is recorded, the program instructing a processor of an image processing apparatus to execute:
obtaining image data generated by an image sensor that forms a predetermined array pattern using color filters of a plurality of colors having mutually different spectral transmittances and in which each of the color filters is arranged at a position corresponding to any of a plurality of pixels and obtaining a correction coefficient from a recording unit configured to record, for each of the pixels, the correction coefficient for correcting a difference between pixel values corresponding to a difference between a spectral sensitivity and a preset reference spectral sensitivity in a predetermined wavelength range in a pixel-of-interest;

calculating an estimation value of a color component as a correction target in the pixel-of-interest using a pixel value of each of pixels in a surrounding pixel of a same color and the correction coefficient, the surrounding pixel of a same color being a pixel surrounding the pixel-of-interest and being a pixel including a color filter having a same color as a color filter arranged on the pixel-of-interest;

calculating a correction amount of the pixel value of the pixel-of-interest based on the estimation value and the correction coefficient of the calculated pixel-of-interest; and correcting the pixel value of the pixel-of-interest based on the calculated correction amount.

* * * * *